United States Patent
Hatori et al.

(10) Patent No.: US 9,297,956 B2
(45) Date of Patent: Mar. 29, 2016

(54) OPTICAL DEVICE, OPTICAL TRANSMITTER, OPTICAL RECEIVER, OPTICAL TRANSCEIVER, AND METHOD OF MANUFACTURING OPTICAL DEVICE

(71) Applicants: FUJITSU LIMITED, Kawasaki-shi, Kanagawa (JP); NEC Corporation

(72) Inventors: Nobuaki Hatori, Tsukuba (JP); Masashige Ishizaka, Tokyo (JP); Takanori Shimizu, Tokyo (JP)

(73) Assignees: FUJITSU LIMITED, Kawasaki (JP); NEC CORPORATION, Tokyo (JP)

( * ) Notice: Subject to any disclaimer, the term of this patent is extended or adjusted under 35 U.S.C. 154(b) by 346 days.

(21) Appl. No.: 13/775,614

(22) Filed: Feb. 25, 2013

(65) Prior Publication Data

US 2013/0229809 A1    Sep. 5, 2013

(30) Foreign Application Priority Data

Mar. 1, 2012  (JP) .................................. 2012-045810

(51) Int. Cl.
*G02B 6/122* (2006.01)
*G02B 6/26* (2006.01)
(Continued)

(52) U.S. Cl.
CPC ................ *G02B 6/1228* (2013.01); *B05D 5/06* (2013.01); *G02B 6/26* (2013.01); *G02B 6/305* (2013.01); *G02B 6/125* (2013.01); *G02B 6/136* (2013.01);
(Continued)

(58) Field of Classification Search
CPC .............................. G02B 6/1228; G02B 6/305
See application file for complete search history.

(56) References Cited

U.S. PATENT DOCUMENTS 6,108,478 A    8/2000 Harpin
6,160,927 A  * 12/2000 Leclerc et al. .................. 385/14
(Continued)

FOREIGN PATENT DOCUMENTS

EP          736785 A1  * 10/1996
JP          03-073905      3/1991
(Continued)

OTHER PUBLICATIONS

Tai Tsuchizawa, et al., "Spot-Size Converters for Rib-Type Silicon Photonic Wire Waveguides", Group IV Photonics, 2008 5th IEEE, International Conference on, IEEE, Sep. 17, 2008, pp. 200-202, XP031344474.

(Continued)

*Primary Examiner* — Michelle R Connelly
(74) *Attorney, Agent, or Firm* — Kratz, Quintos & Hanson, LLP

(57) ABSTRACT

An optical device includes: a first cladding layer; a core layer disposed on the first cladding layer and, with increase in its sectional area, extending from a first end which receives/outputs light along a direction from the first end toward a second end; a slab layer disposed on the first cladding layer and extending to the second end along the direction from the first end toward the second end; a rib layer disposed on the slab layer and, with decrease in its sectional area, extending to the second end along the direction from the first end toward the second end; and a second cladding layer disposed on the core layer and the rib layer. The core layer and both of the slab and rib layers are optically coupled in a part in which the sectional are of the core and rib layers is the maximum.

12 Claims, 20 Drawing Sheets

(51) Int. Cl.
  *G02B 6/125* (2006.01)
  *B05D 5/06* (2006.01)
  *G02B 6/30* (2006.01)
  *G02B 6/136* (2006.01)
  *G02B 6/12* (2006.01)

(52) U.S. Cl.
  CPC . *G02B 2006/121* (2013.01); *G02B 2006/12097* (2013.01); *G02B 2006/12147* (2013.01); *G02B 2006/12195* (2013.01)

(56) References Cited

U.S. PATENT DOCUMENTS

| | | | | |
|---|---|---|---|---|
| 8,538,213 | B2 * | 9/2013 | Uchida et al. | 385/43 |
| 2005/0185893 | A1 | 8/2005 | Liu | |
| 2005/0244104 | A1 * | 11/2005 | Payne | 385/43 |
| 2011/0211786 | A1 | 9/2011 | Ushida | |
| 2012/0156369 | A1 * | 6/2012 | Kim et al. | 427/163.2 |
| 2012/0207424 | A1 * | 8/2012 | Zheng et al. | 385/2 |

FOREIGN PATENT DOCUMENTS

| | | |
|---|---|---|
| JP | 06-067043 | 3/1994 |
| JP | 2001-510589 A1 | 7/2001 |
| JP | 2005-156674 A1 | 6/2005 |
| JP | 2010-139629 A | 6/2010 |
| JP | 2011-180595 A1 | 9/2011 |
| JP | 2011-215331 A1 | 10/2011 |
| WO | WO 2009/002253 A1 | 12/2008 |
| WO | WO 2009002253 A1 * | 12/2008 |

OTHER PUBLICATIONS

Hidehiko Yoda, et al., "A Two-Port Single-Mode Fiber-Silicon Wire Waveguide Coupler Module Using Spot-Size Converters", Journal of Lightwave Technology, IEEE Service Center, vol. 27, No. 10, May 15, 2009, pp. 1315-1319, XP011256195.

European Search Report dated Jun. 10, 2013, in counterpart European Application No. 13155840.5.

Office Action of Japan Patent Application 2012-045810 dated Aug. 4, 2015, with full translation.

* cited by examiner

OPTICAL DEVICE, OPTICAL TRANSMITTER, OPTICAL RECEIVER, OPTICAL TRANSCEIVER, AND METHOD OF MANUFACTURING OPTICAL DEVICE

CROSS-REFERENCE TO RELATED APPLICATION

This application is based upon and claims the benefit of priority of the prior Japanese Patent Application No. 2012-045810, filed on Mar. 1, 2012, the entire contents of which are incorporated herein by reference.

FIELD

The present invention relates to an optical device, an optical transmitter, an optical receiver, an optical transceiver, and a method of manufacturing an optical device.

BACKGROUND

Hitherto, a planar light circuit (PLC) formed on a substrate is used in the field of optical communications. A planar light circuit is used mainly as a silica-based material as the material of an optical waveguide. For example, a planar light circuit of an array waveguide grating (AWG) employing a silica-based material, a splitter, or the like is used as a backbone component in optical communications.

Recently, an attempt to realize a smaller system by mounting an active optical device and a passive optical device on a common PLC substrate is being made. For example, a novel optical device such as a wavelength-variable light source in which a compound semiconductor amplifier (SOC) is hybrid-packaged on a silica-based PLC is being developed.

However, as a demanded function is becoming more complicated and sophisticated, the device dimension and consumption power of the conventional planar optical circuit are increasing. Consequently, it is becoming difficult to improve the function or performance of an optical circuit using the conventional silica-based PLC.

Accordingly, a technique of forming an optical waveguide on an SOI (Silicon On Insulator) substrate using a silicon microfabrication technique such as a silicon wire waveguide or a photonic crystal (PC) is being studied. Development of a small backbone component characterized by low power consumption is being examined using the silicon microfabrication technique.

A silicon wire waveguide includes, for example, a channel-type optical waveguide in which a core layer is disposed on a lower cladding layer and a rib-type optical waveguide in which a slab layer is disposed on a lower cladding layer and a core layer is formed on the slab layer. On the core layer or the rib layer, an upper cladding layer is disposed. The optical waveguides have different characteristics.

As the channel-type optical waveguide, a bending optical waveguide having low optical loss can be formed. For example, an optical waveguide having a bending radius of a few microns to about ten microns can be formed using a channel-type optical waveguide while suppressing optical loss. On the other hand, in the channel-type optical waveguide, the influence of a change in structure parameters such as width and thickness exerted on optical characteristics such propagation loss and effective refractive index is large, so that the allowable range of dimension precision in manufacture is small. Such a characteristic may become an issue when manufacturing a resonator or a filter using the channel-type optical waveguide. Consequently, there is a case that the channel-type optical waveguide is requested to have high manufacturing precision.

In the rib-type optical waveguide, as compared with the channel-type optical waveguide, the influence of a change in structure parameters exerted on optical characteristics such as propagation loss and effective refractive index is smaller, so that dimension precision demanded in manufacture is lessened. On the other hand, in the rib-type optical waveguide, the optical loss of the bending optical waveguide is larger than that in the channel-type optical waveguide. Consequently, there is a case that it is unsuitable to form a bending optical waveguide having a small radius of curvature.

Japanese Laid-open Patent Publication No. 2005-156674
Japanese National Publication of International Patent Application No. 2001-510589
Japanese Laid-open Patent Publication No. 2011-215331
Japanese Laid-open Patent Publication No. 2011-180595

SUMMARY

According to an aspect of an embodiment, an optical device disclosed in the specification includes: a first cladding layer; a core layer disposed on the first cladding layer and, with increase in its sectional area, extending from a first end which receives/outputs light along a direction from the first end toward a second end; a slab layer disposed on the first cladding layer and extending to the second end along the direction from the first end toward the second end; a rib layer disposed on the slab layer and, with decrease in its sectional area, extending to the second end along the direction from the first end toward the second end; and a second cladding layer disposed on the core layer and the rib layer, wherein the core layer and both of the slab layer and the rib layer are optically coupled in a part in which the sectional area of the core layer is the maximum and a part in which the sectional area of the rib layer is the maximum.

According to an aspect of an embodiment, an optical transmitter disclosed in the specification includes: a substrate; an optical device including a first cladding layer disposed on the substrate, a core layer disposed on the first cladding layer and, with increase in its sectional area, extending from a first end which receives/outputs light along a direction from the first end toward a second end, a slab layer disposed on the first cladding layer and extending to the second end along the direction from the first end toward the second end, a rib layer disposed on the slab layer and, with decrease in its sectional area, extending to the second end along the direction from the first end toward the second end, and a second cladding layer disposed on the core layer and the rib layer, the core layer and both of the slab layer and the rib layer being optically coupled in a part in which the sectional area of the core layer is the maximum and a part in which the sectional area of the rib layer is the maximum; and a light generator disposed on the substrate, outputting light to the first end, making the light propagate through the optical device and output from the second end.

According to an aspect of the embodiment, an optical receiver disclosed in the specification includes: a substrate; an optical device including a first cladding layer disposed on the substrate, a core layer disposed on the first cladding layer and, with increase in its sectional area, extending from a first end which receives/outputs light along a direction from the first end toward a second end, a slab layer disposed on the first cladding layer and extending to the second end along the direction from the first end toward the second end, a rib layer disposed on the slab layer and, with decrease in its sectional area, extending to the second end along the direction from the first end toward the second end, and a second cladding layer disposed on the core layer and the rib layer, the core layer and both of the slab layer and the rib layer being optically coupled in a part in which the sectional area of the core layer is the maximum and a part in which the sectional area of the rib layer is the maximum; and a photodetector disposed on the substrate and detecting light which enters from the second end, propagates through the optical device, and is output from the first end.

According to an aspect of the embodiment, an optical transceiver disclosed in the specification includes: a first substrate; a first optical device including a first cladding layer disposed on the first substrate, a first core layer disposed on the first cladding layer and, with increase in its sectional area, extending from a first end which receives/outputs light along a direction from the first end toward a second end, a first slab layer disposed on the first cladding layer and extending to the second end along the direction from the first end toward the second end, a first rib layer disposed on the first slab layer and, with decrease in its sectional area, extending to the second end along the direction from the first end toward the second end, and a second cladding layer disposed on the first core layer and the first rib layer, the first core layer and both of the first slab layer and the first rib layer being optically coupled in a part in which the sectional area of the first core layer is the maximum and a part in which the sectional area of the first rib layer is the maximum; a light generator disposed on the first substrate, outputting light to the first end, making the light propagate through the first optical device and output from the second end; a second substrate; a second optical device including a third cladding layer disposed on the second substrate, a second core layer disposed on the third cladding layer and, with increase in its sectional area, extending from a third end which receives/outputs light along a direction from the third end toward a fourth end, a second slab layer disposed on the third cladding layer and extending to the fourth end along the direction from the third end toward the fourth end, a second rib layer disposed on the second slab layer and, with decrease in its sectional area, extending to the fourth end along the direction from the third end toward the fourth end, and a fourth cladding layer disposed on the second core layer and the second rib layer, the second core layer and both of the second slab layer and the second rib layer being optically coupled in a part in which the sectional area of the second core layer is the maximum and a part in which the sectional area of the second rib layer is the maximum; and a photodetector disposed on the second substrate and detecting light which enters from the fourth end, propagates through the second optical device, and is output from the third end.

According to an aspect of the embodiment, a method of manufacturing an optical device, disclosed in the specification includes: forming, on a first cladding layer, a core layer extending from a first end along a direction from the first end toward a second end with increase in its sectional area, and a slab layer extending to the second end along the direction from the first end toward the second end and including, on the slab layer, a rib layer which extends to the second end along the direction from the first end toward the second end with decrease in its sectional area, the core layer and both of the slab layer and the rib layer being optically coupled in a part in which the sectional area of the core layer is the maximum and a part in which the sectional area of the rib layer is the maximum; and forming a second cladding layer on the core layer and the slab layer.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An optical device disclosed in the specification is a compact device for optically connecting a channel-type optical waveguide and a rib-type optical waveguide and realizing reduction in optical loss. By using the optical device disclosed in the specification, a device having advantages of the optical characteristics of both of the channel-type optical waveguide and the rib-type optical guide can be formed. Hereinafter, using a device for converting the spot size of light as an example, a preferred first embodiment of the optical device disclosed in the specification will be illustrated with reference to the drawings. The technical scope of the present invention is not limited to the embodiments but includes the invention described in the scope of claims and its equivalents.

Figure 1:
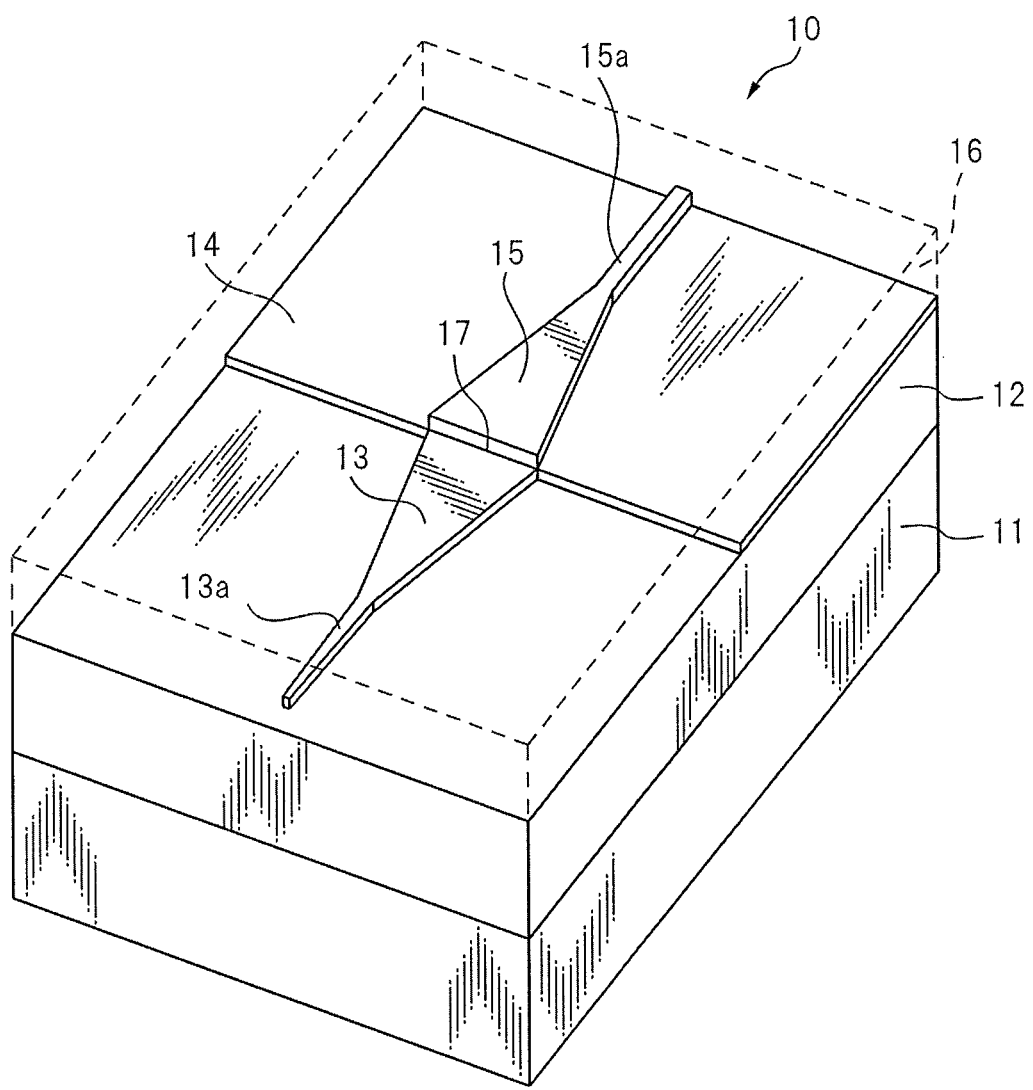
FIG. 1 is a perspective view depicting a first embodiment of an optical device disclosed in the specification.
Figure 2:
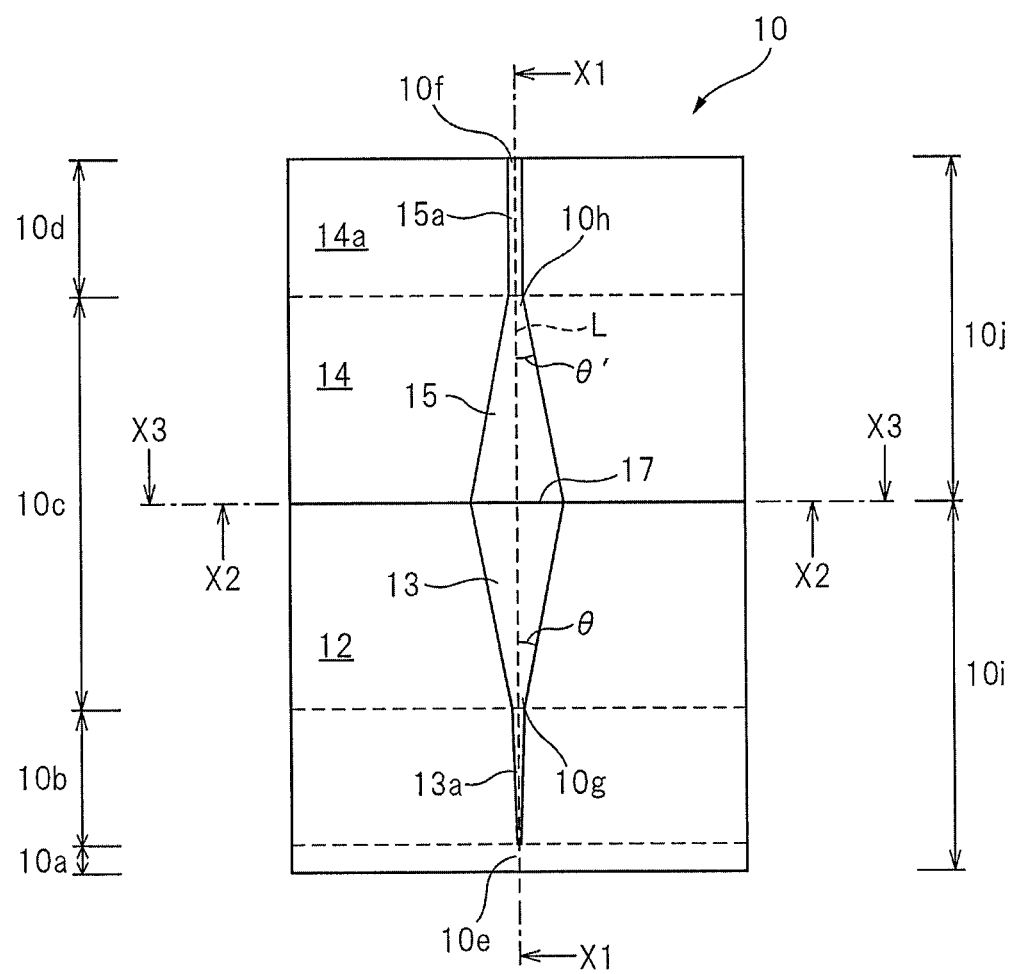
FIG. 2 is a plan view of the optical device depicted in FIG. 1.
Figure 3:
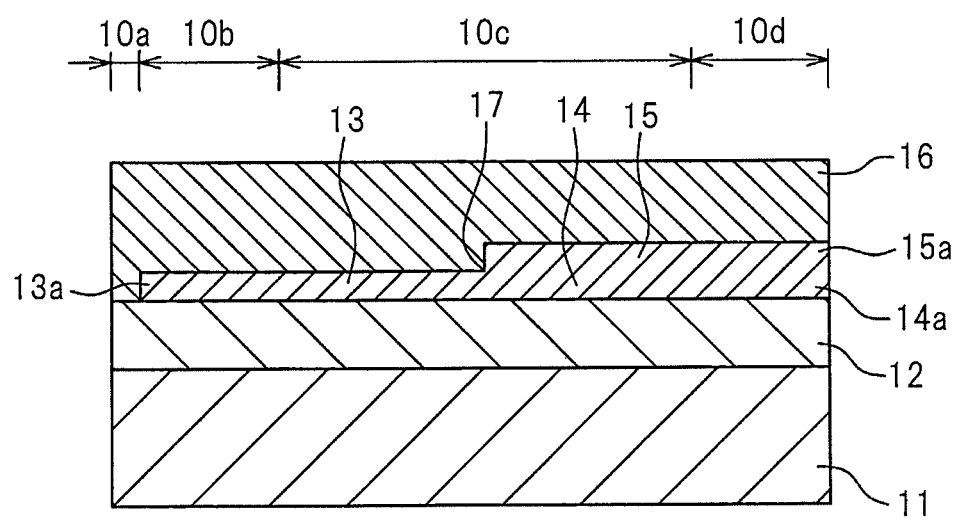
FIG. 3 is a cross section taken along line X1-X1 of FIG. 2.
Figure 4A:
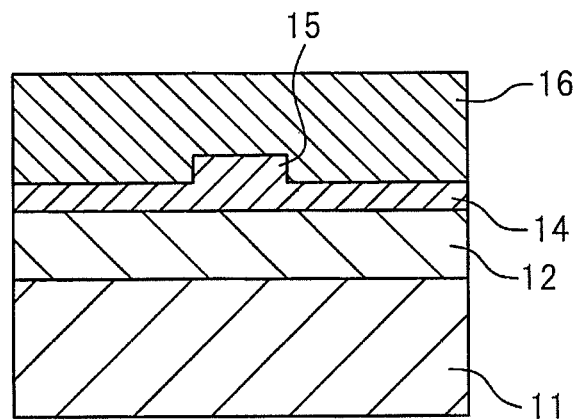
FIG. 4A is an end view taken along line X2-X2 of FIG. 2.
Figure 4B:
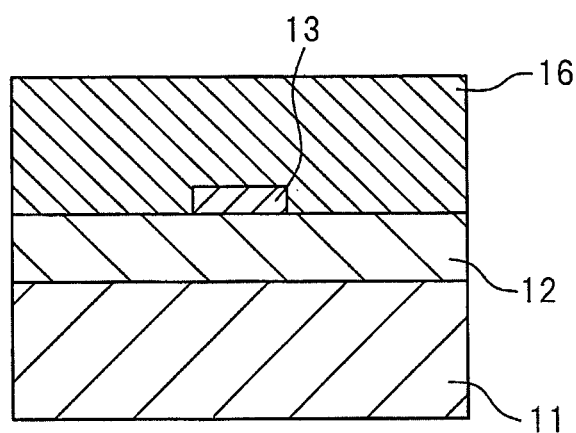
FIG. 4B is an end view taken along line X3-X3 of FIG. 2.

FIG. 1 is a perspective view depicting a first embodiment of an optical device disclosed in the specification. FIG. 2 is a plan view of the optical device depicted in FIG. 1. FIG. 3 is a cross section taken along line X1-X1 of FIG. 2. FIG. 4A is an end view taken along line X2-X2 of FIG. 2, and FIG. 4B is an end view taken along line X3-X3 of FIG. 2.

An optical device 10 of the embodiment receives light from the outside, converts the spot size of the received light to smaller spot size, and outputs light having the smaller spot size. On the contrary, the optical device 10 receives light from the outside, converts the spot size of the received light to larger spot size, and outputs light having the larger spot size.

As depicted in FIG. 2, the optical device 10 has one end 10e which receives/outputs light and the other end 10f which outputs/receives light. In the optical device 10, input light propagates from the one end 10e to the other end 10f or propagates from the other end 10f to the one end 10e.

To the one end 10e, for example, another optical device which propagates light having large spot size such as an optical fiber is optically coupled. To the other end 10f, for example, another optical device which propagates light having small spot size such as a silicon wire waveguide is optically coupled.

The optical device 10 has, in order from the one end 10e to the other end 10f, a second extension unit 10a, a first extension unit 10b, a device body 10c, and a third extension unit 10d.

First, the device body 10c will be illustrated and, then, the first extension unit 10b, the second extension unit 10a, and the third extension unit 10d will be illustrated.

The device body 10c has a first end 10g which receives/outputs light from/to the first extension unit 10b, and a second end 10h which receives/outputs light from/to the third extension unit 10d.

The device body 10c has a semiconductor substrate 11 and a lower cladding layer 12 disposed on the substrate 11. The device body 10c also has a core layer 13 disposed on the lower cladding layer 12 and extending from the first end 10g along a direction from the first end 10g which receives/outputs light toward the second end 10h. The device body 10c also has a slab layer 14 disposed on the lower cladding layer 12 and extending to the second end 10h along a direction from the first end 10g toward the second end 10h. The slab layer 14 has a flat plate shape. The device body 10c also has a rib layer 15 disposed on the slab layer 14 and extending to the second end 10h along a direction from the first end 10g toward the second end 10h. In the specification, the direction from the first end 10g toward the second end 10h coincides with the direction of light propagating in the optical device 10.

Preferably, the refractive index of the lower cladding layer 12 is lower than the refractive indexes of the core layer 13, the slab layer 14, and the rib layer 15 from the viewpoint of confining propagating light in the core layer 13, the slab layer 14, and the rib layer 15.

The core layer 13 and both of the slab layer 14 and the rib layer 15 are optically coupled in the part in which the sectional area of the core layer 13 is the maximum and the part in which the sectional area of the rib layer 15 is the maximum. Hereinbelow, the part in which the core layer 13 and both of the slab layer 14 and the rib layer 15 are optically coupled will be also referred to as an optical coupling unit 17.

In the optical device 10, the thickness of the core layer 13, the slab layer 14, and the rib layer 15 is constant.

The device body 10c has an upper cladding layer 16 disposed on the core layer 13, the slab layer 14, and the rib layer 15. Preferably, the refractive index of the upper cladding layer 16 is lower than the refractive indexes of the core layer 13, the slab layer 14, and the rib layer 15 from the viewpoint of confining propagating light in the core layer 13, the slab layer 14, and the rib layer 15. In FIG. 1, only the contour of the upper cladding layer 16 is indicated by the chain line. In FIG. 2, the upper cladding layer 16 is not depicted so that the structure can be easily understood.

The core layer 13 extends from the first end 10g to the optical coupling unit 17 with increase in its sectional area in the direction from the first end 10g toward the second end 10h. In the optical device 10, since the thickness of the core layer 13 is constant, the width of the core layer 13 increases from the first end 10g to the optical coupling unit 17 in the direction from the first end 10g toward the second end 10h. In the optical device 10, the width of the core layer 13 gradually increases in the direction from the first end 10g toward the second end 10h. The width of the core layer 13 is the dimension in the direction orthogonal to the direction from the first end 10g toward the second end 10h. This is also applied to the width of the rib layer 15 which will be described later. The sectional area or width of the core layer 13 may increase linearly or in a curve in the direction from the first end 10g toward the second end 10h. Preferably, the sectional area or width of the core layer 13 increases gently so as to suppress radiation loss of the propagation light. For example, when the width of the core layer 13 increases linearly as depicted in FIG. 2, preferably, the range of an angle θ formed by center line L and the side of the core layer 13 is determined so that tan θ is 0.01 or less.

In the optical device 10, in the direction from the first end 10g toward the second end 10h, a part of a section 10i of the channel-type optical guide is formed by the lower cladding layer 12, the core layer 13, and the upper cladding layer 16 in the region from the first end 10g to the optical coupling unit 17.

The slab layer 14 extends from the optical coupling unit 17 to the second end 10h so as to cover the lower cladding layer 12 in the direction from the first end 10g toward the second end 10h. In the optical device 10, the thickness of the slab layer 14 is constant.

The rib layer 15 disposed on the slab layer 14 extends, with decrease in its sectional area, from the optical coupling unit 17 to the second end 10h in the direction from the first end 10g toward the second end 10h. Since the thickness of the rib layer 15 is constant in the optical device 10, the rib layer 15 extends, with decrease in its width, from the optical coupling unit 17 to the second end 10h in the direction from the first end 10g toward the second end 10h. In the optical device 10, the width of the rib layer 15 gradually decreases in the direction from the first end 10g toward the second end 10h. The sectional area or width of the rib layer 15 may decrease linearly or in a curve in the direction from the first end 10g toward the second end 10h. Preferably, the sectional area or width of the rib layer 15 decreases gently so as to suppress radiation loss of the propagation light. For example, when the width of the rib layer 15 decreases linearly as depicted in FIG. 2, preferably, the range of an angle θ' formed by the center line L and the side of the rib layer 15 is determined so that tan θ' is 0.01 or less.

In the optical device 10, in the direction from the first end 10g toward the second end 10h, a part of a section 10j of the rib-type optical guide is formed by the lower cladding layer 12, the slab layer 14, and the rib layer 15 of the region from the optical coupling unit 17 to the second end 10h.

In the optical coupling unit 17, it is preferable that the width of the core layer 13 and that of the rib layer 15 are equal from the viewpoint of reducing an optical loss between the section 10i of the channel-type optical waveguide and the section 10j of the rib-type optical waveguide. In the optical coupling unit 17 of the optical device 10, the position in the width direction of the core layer 13 and that in the width direction of the rib layer 15 match each other. The width direction of the core layer 13 denotes a direction orthogonal to the direction from the first end 10g toward the second end 10h in the optical device 10.

Preferably, the core layer 13 and the rib layer 15 have the relation of line symmetry with respect to the center line L of the optical device 10 from the viewpoint of reducing the optical loss between the section 10i of the channel-type optical waveguide and the section 10j of the rib-type optical waveguide. In the optical device 10, the core layer 13 and the rib layer 15 are formed line-symmetrically with respect to the center line L.

Further, from the viewpoint of reducing the optical loss between the section 10i of the channel-type optical waveguide and the section 10j of the rib-type optical waveguide, in the optical coupling unit 17 in which the core layer 13 and both of the slab layer 14 and the rib layer 15 are optically coupled, the thickness of the core layer 13 is equal to that of the slab layer 14.

As depicted in FIG. 3, the core layer 13, the slab layer 14, and the rib layer 15 are integrally formed in the optical device 10. The core layer 13 and the slab layer 14 have the same thickness, and the rib layer 15 is a layered part projected from the slab layer 14 into the upper cladding layer 16.

In the optical coupling unit 17, the rib layer 15 is not coupled directly with the core layer 13. The rib layer 15 and the core layer 13 are optically coupled to each other mainly via the slab layer 14.

The end view taken along line X2-X2 depicted in FIG. 4A is an end view of a face crossing the optical coupling unit 17 viewed from the core layer 13 side to the rib layer 15 side. The end view taken along line X3-X3 depicted in FIG. 4B is an end view of a face crossing the optical coupling unit 17 viewed from the rib layer 15 side to the core layer 13 side.

In the optical coupling unit 17, the core layer 13 is physically coupled to the slab layer 14 positioned below the rib layer 15.

In the device body 10c of the optical device 10, preferably, the width of the core layer 13 in the first end 10g and the width of the rib layer 15 in the second end 10h are set so as to propagate light in a single mode.

Next, the first extension unit 10b will be illustrated.

The first extension unit 10b is formed by stacking the substrate 11, the lower cladding layer 12, and the upper cladding layer 16 so that the substrate 11, the lower cladding layer 12, and the upper cladding layer 16 extend to the outside from the first end 10g of the device body 10c.

In the first extension unit 10b, the core layer 13 extends from the first end 10g with decrease in its sectional area, thereby forming a core extension unit 13a. The core extension unit 13a has the thickness same as that of the core layer 13. The core extension unit 13a extends from the first end 10g toward the one end 10e so as to be tapered from the first end 10g. Since the electric field intensity distribution of the waveguide mode is narrowed as the core extension unit 13a is widened, the spot size of light which enters from the one end 10e of the optical device 10 decreases as the light propagates through the core extension unit 13a.

In the optical device 10, the first extension unit 10b serves as a part of the section 10i of the channel-type optical waveguide.

Next, the second extension unit 10a will be illustrated.

The second extension unit 10a is formed by stacking the substrate 11, the lower cladding layer 12, and the upper cladding layer 16 so that the substrate 11, the lower cladding layer 12, and the upper cladding layer 16 extend to the outside from the first extension unit 10b.

In the second extension unit 10a, the core layer 13 does not extend.

By providing the second extension unit 10a having no core layer 13, at the time of forming the end face of the end 10e by dry etching of the optical device 10 from above, the influence on the shape precision exerted due to variations in etching rate among the upper and lower cladding layers 12 and 16 and the core layer 13 can be prevented. When etching selectivity among the upper and lower cladding layers 12 and 16 and the core layer 13 is low, even when the second extension unit is not provided, the influence on the shape precision exerted due to variations in etching rate is small.

Next, the third extension unit 10d will be illustrated.

The third extension unit 10d is formed by stacking the substrate 11, the lower cladding layer 12, and the upper cladding layer 16 so that the substrate 11, the lower cladding layer 12, and the upper cladding layer 16 extend to the outside from the second end 10h of the device body 10c.

In the third extension unit 10d, the slab layer 14 and the rib layer 15 extend from the second end 10h of the device body 10c to another end 10f, thereby forming a slab extension unit 14a and a rib extension unit 15a. The rib extension unit 15a extends in the same width as that of the rib layer 15 in the second end 10h.

In the optical device 10, the third extension unit 10d serves as a part of the section 10j of the rib-type optical waveguide.

Hereinafter, with reference to FIG. 5, a state where light which enters the one end 10e propagates through the optical device 10 will be illustrated.

Figure 5:
FIG. 5 is a diagram depicting the profile of a mode field of light which propagates in the optical device of the first embodiment depicted in FIG. 2.
Figure 5:
Figure 5:
Figure 5:
Figure 5:
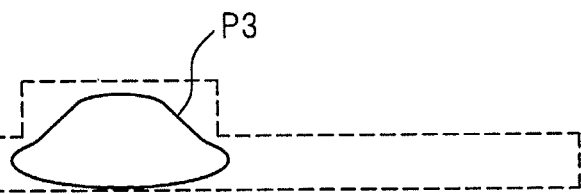

FIG. 5 is a diagram depicting the profile of a mode field of light which propagates in the optical device of the first embodiment depicted in FIG. 2.

First, light having a large spot size is incident on the one end 10e of the optical device 10 from the outside. The light incident on the one end 10e propagates through the second extension unit 10a and enters the first extension unit 10b.

The spot size of the light which enters the first extension unit 10b decreases as it propagates through the core extension unit 13a.

As the width of the core layer 13 increases, the electric field intensity distribution of the waveguide mode fits in the core layer 13. The light which enters the first end 10g of the device body 10c propagates through the core layer 13 while the width of the core layer 13 increases and the spot size of the light enlarges.

A mode profile P1 of FIG. 5 expresses the shape of the field of light in the core layer 13 in the first end 10g of the device body 10c. A mode profile P2 of FIG. 5 expresses the shape of the field of light on the side of the core layer 13 connected to the optical coupling unit 17. The chain line surrounding the mode profiles P1 and P2 indicates the contour of the core layer 13.

The mode profile P1 of light which enters the first end 10g enlarges to be horizontally long as depicted by the mode profile P2 in the optical coupling unit 17.

In the optical coupling unit 17, the light propagating through the core layer 13 propagates through the slab layer 14 and is optically coupled to the rib layer 15.

A mode profile P3 in FIG. 5 expresses the shape of the field of light on the side of the slab layer 14 and the rib layer 15 connected to the optical coupling unit 17. The chain line surrounding the mode profile P3 indicates the contour of the slab layer 14 and the rib layer 15.

The mode profile P2 in the core layer 13 in the optical coupling unit 17 has a shape closer to the mode profile P3 of light propagating in the slab layer 14 and the rib layer 15 than the mode profile P1 of light which enters the first end 10g. Therefore, in the device body 10c, the field of light which enters the section 10i of the channel-type optical waveguide is changed adiabatically (with little power loss) and, in the optical coupling unit 17, the mode field of propagating light is made closer to the mode profile P3 of light which propagates in the slab layer 14 and the rib layer 15 and is coupled to the section 10j of the rib-type optical waveguide.

The light propagating through the section 10j of the rib-type optical waveguide propagates through the slab layer 14 and the rib layer 15 while the spot size of the light decreases as the rib layer 15 is narrowed.

The light propagating through the section 10j of the rib-type optical waveguide enters the third extension unit 10d from the second end 10h of the device body 10c, propagates through the slab layer 14a and the rib layer 15a, and is output from the other end 10f.

In the optical device 10, the spot size of the light which is output from the other end 10f is similar to that of the light of the first end 10g and, consequently, converted to be smaller than the spot size of light incident on the one end 10e from the outside. There is the case where light which is incident on the first end 10g in the single mode generates a higher-order mode as it propagates through the core layer 13 whose width increases. As the light propagates in the rib layer 15 whose width decreases, the higher-order mode disappears, and only the light in the single mode is output from the second end 10h to the third extension unit 10d.

The light propagating in the device body 10c enters an optically discontinuous state in the optical coupling unit 17. Reduction in mode mismatch which may be caused by the optically discontinuous state in the optical coupling unit 17 will be illustrated below.

Figure 6:
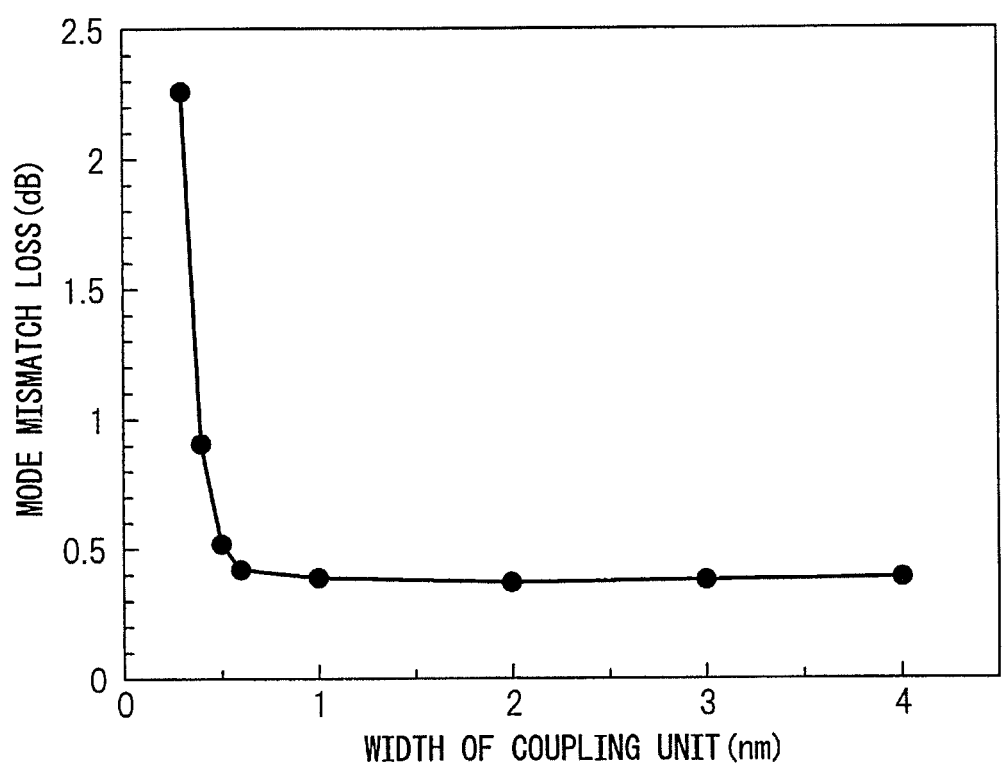
FIG. 6 is a diagram depicting the relation between mode mismatch loss in an optical coupling unit and width of the optical coupling unit.

FIG. 6 is a diagram depicting the relation between mode mismatch loss in the optical coupling unit and width of the optical coupling unit. FIG. 6 depicts a result of solving a Maxwell equation by numerical computation using the finite element method under a predetermined boundary value condition.

The vertical axis of FIG. 6 indicates the value of a mode mismatch loss between light propagating in the section 10i of the channel-type optical waveguide and light propagating in the section 10j of the rib-type optical waveguide, and the horizontal axis indicates the width of the optical coupling unit 17.

The mode mismatch loss depicted in FIG. 6 is about 0.4 dB and constant in the range where the width of the optical coupling unit 17 is larger than 0.5 µm but sharply increases when the width of the optical coupling unit 17 becomes smaller than 0.5 µm.

It is therefore understood that, by selecting a value larger than a predetermined value as the width of the optical coupling unit 17, the value of the mode mismatch loss can be largely reduced. In the example depicted in FIG. 6, the width of the optical coupling unit 17 is set to preferably 1 µm or larger, more particularly, 2 µm or larger.

When light is incident on the other end 10f of the optical device 10, the incident light propagates from the third extension unit 10d toward the second extension unit 10a via the device body 10c and the first extension unit 10b. In this case, the propagation direction of the light propagating in the optical device 10 is opposite to that in the above description, the light is converted so that its spot size becomes larger, and the converted light is output. To the profile of the field of the propagating light, the above description made with reference to FIG. 5 is properly applied.

The materials of forming the optical device 10 will now be illustrated.

As the substrate 11, for example, a silicon substrate can be used. As the lower cladding layer 12, for example, dielectric such as silicon oxide ($SiO_2$) or polymer can be used. As the core layer 13, the slab layer 14, or the rib layer 15, for example, silicon can be used. As the upper cladding layer 16, dielectric such as silicon oxide ($SiO_2$) or dielectric such as polymer can be used.

When an SOI substrate is used, the substrate 11 is formed by using a silicon substrate in the SOI substrate, the lower cladding layer 12 is formed by using an insulating layer in the SOI substrate, and the core layer 13, the slab layer 14, and the rib layer 15 can be easily formed by using a silicon layer in the SOI substrate. By using such a silicon semiconductor material, the optical device 10 can be formed by using the microfabrication technique of the silicon semiconductor.

In the optical device 10 of the foregoing embodiment, the section 10i of the channel-type optical waveguide and the section 10j of the rib-type optical waveguide can be coupled while suppressing the optical loss.

Another channel-type optical waveguide such as a bending optical waveguide can be connected to the channel-type optical waveguide by using the optical device 10 of the embodiment. In such a manner, an optical circuit having low optical loss can be formed. Particularly, by providing the section 10i of the channel-type optical waveguide with the function of an input/output interface realizing optical coupling to the outside, an optical circuit having low optical loss can be realized. For example, optical coupling to an optical fiber or a semiconductor active element can be performed with the section 10i of the channel-type optical waveguide.

Using the optical device 10 of the embodiment, another rib-type optical waveguide can be formed so as to be connected to the rib-type optical waveguide. In such a manner, an optical circuit having low optical loss can be formed.

As described above, using the optical device 10 of the embodiment, an optical circuit having a plurality of devices utilizing the characteristics of the channel-type optical waveguide and the rib-type optical waveguide can be easily formed while suppressing optical loss.

In the optical device 10 of the embodiment, each of the core layer 13 and the rib layer 15 has a shape which is flat in the horizontal direction. Therefore, the dimension in the horizontal direction of the spot size of light and that in the vertical direction can be controlled independently of each other to certain extent. In an optical integrated device in which the optical device 10 is integrated with another device such as an optical modulator or a light receiving device, it is requested to thin the upper cladding layer as much as possible from the viewpoint of simplification of the manufacturing process, reduction in cost, and the like. In this case, when enlarging the spot size of light, enlargement in the vertical direction is requested to be suppressed more than that in the horizontal direction. The optical device 10 of the embodiment can suppress the coupling loss of light and satisfy such a request. Therefore, using the optical device 10 of the embodiment, an input/output waveguide having little coupling loss can be realized in an optical integrated device in which the thickness of the upper cladding layer is limited. The horizontal direction in this case is a direction orthogonal to a direction of stacking the layers and the light propagation direction.

Hereinafter, modifications of the optical device of the foregoing first embodiment will be illustrated with reference to the drawings.

Figure 7:
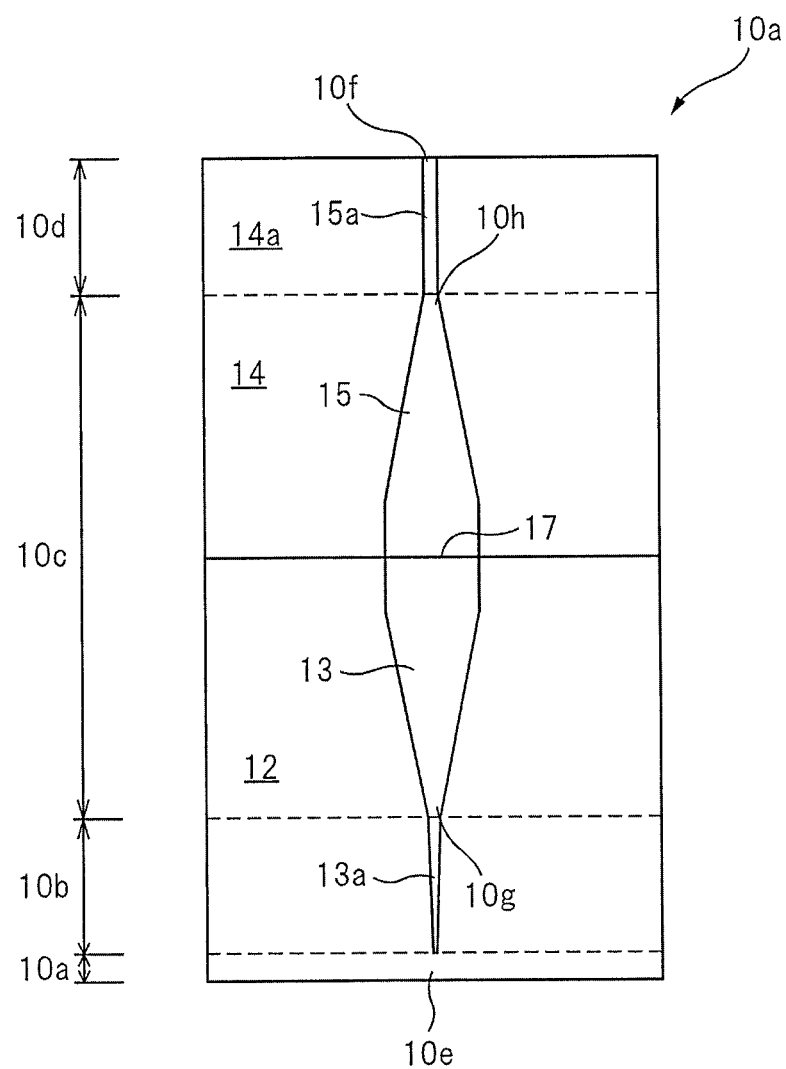
FIG. 7 is a diagram depicting a first modification of the optical device of the first embodiment.

FIG. 7 is a diagram depicting a first modification of the optical device of the first embodiment.

In an optical device 10a of the first modification, the core layer 13 extends, with increase in its sectional area (width), from the first end 10g along a direction from the first end 10g toward the second end 10h. After reaching the maximum sectional area (width), the core layer 13 has the value of the maximum sectional area (width) for predetermined length. In such a manner, the core layer 13 has a part of the maximum sectional area (width) for the predetermined length around the optical coupling unit 17.

In the optical device 10a, the rib layer 15 extends with the maximum sectional area (width) for the predetermined length from the optical coupling unit 17 along a direction from the first end 10g toward the second end 10h. After that, the rib layer 15 extends to the second end 10h with decrease in its sectional area (width). As described above, the rib layer 15 has a part of the maximum sectional area (width) for the predetermined length around the optical coupling unit 17.

The other structure of the optical device 10a of the first modification is similar to that of the foregoing first embodiment.

Figure 8:
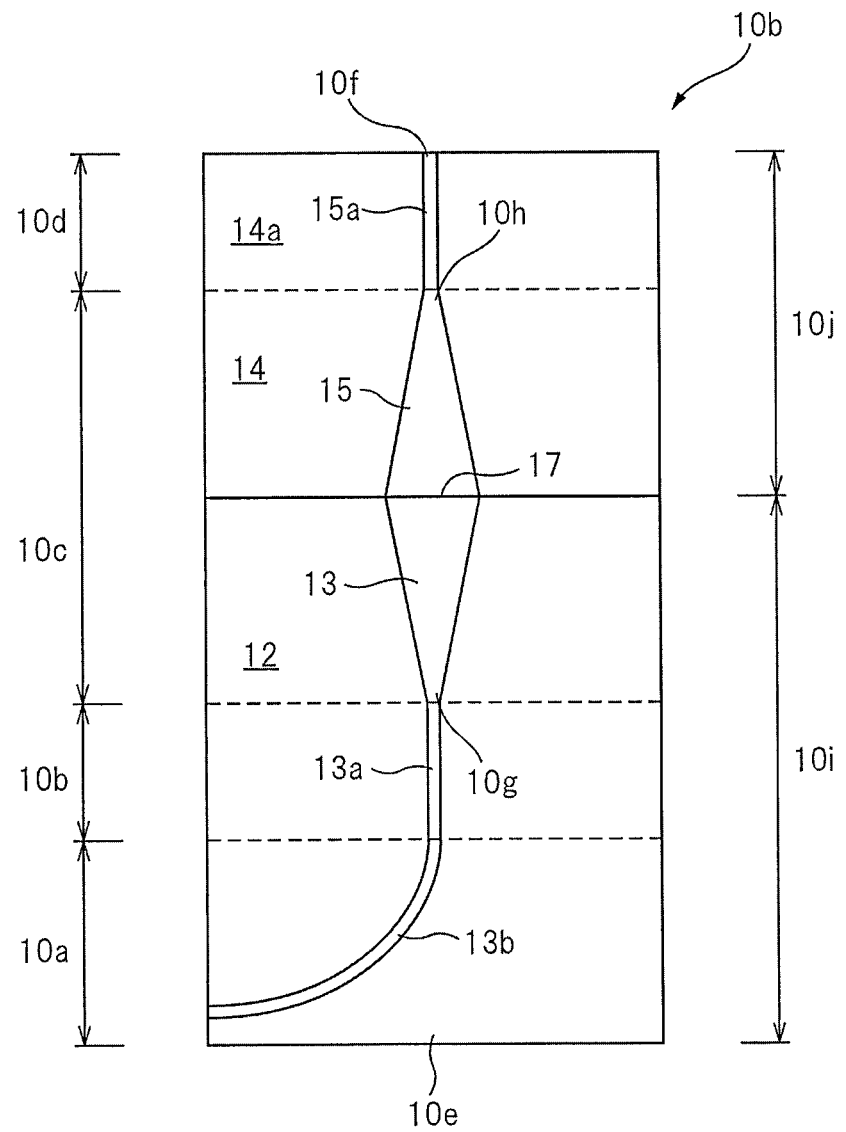
FIG. 8 is a diagram depicting a second modification of the optical device of the first embodiment.

FIG. 8 is a diagram depicting a second modification of the optical device of the first embodiment.

In an optical device 10b of the second embodiment, the core extension unit 13a extends with its width constant in the first extension unit 10b and further extends while being bent in the second extension unit 10a, thereby forming a bent core extension unit 13b. Preferably, the width of the core extension unit 13a is equal to that of the rib extension unit 15a. The second extension unit 10a has a channel-type optical waveguide having the bent optical waveguide as described above. In the modification, the second extension unit 10a also serves as a part of the section 10i of the channel-type optical waveguide. For example, light incident from the outside propagates through the bending optical waveguide having the bent core extension unit 13b and the optical waveguide having the core extension unit 13b and, after that, enters the device body 10c. The light which enters the device body 10c is output to the rib extension unit 15a as a part of the rib-type optical waveguide.

Preferably, the optical circuit having the optical device has a channel-type optical waveguide having small bending radius from the viewpoint of miniaturization. On the other hand, since the influence of a change in the structure parameters such as width and thickness of the channel-type optical waveguide exerted on optical characteristics such as propagation loss and effective refractive index is large, the allowable range of dimension precision in manufacture is small. It is consequently preferable to form the part other than the bent optical waveguide by using the rib-type optical waveguide in which the dimensional precision in manufacture is less. Therefore, by providing the section 10i of the channel-type optical waveguide of the optical device with the channel-type optical waveguide having small bending radius like in the second modification, a small-sized optical circuit can be formed while suppressing the optical loss.

Hereinafter, a second embodiment of the optical device will be illustrated with reference to FIGS. 9 to 13. To the points which will not be illustrated in the other embodiments, the above detailed description of the first embodiment is properly applied. The same reference numerals are designated for the same components.

Figure 9:
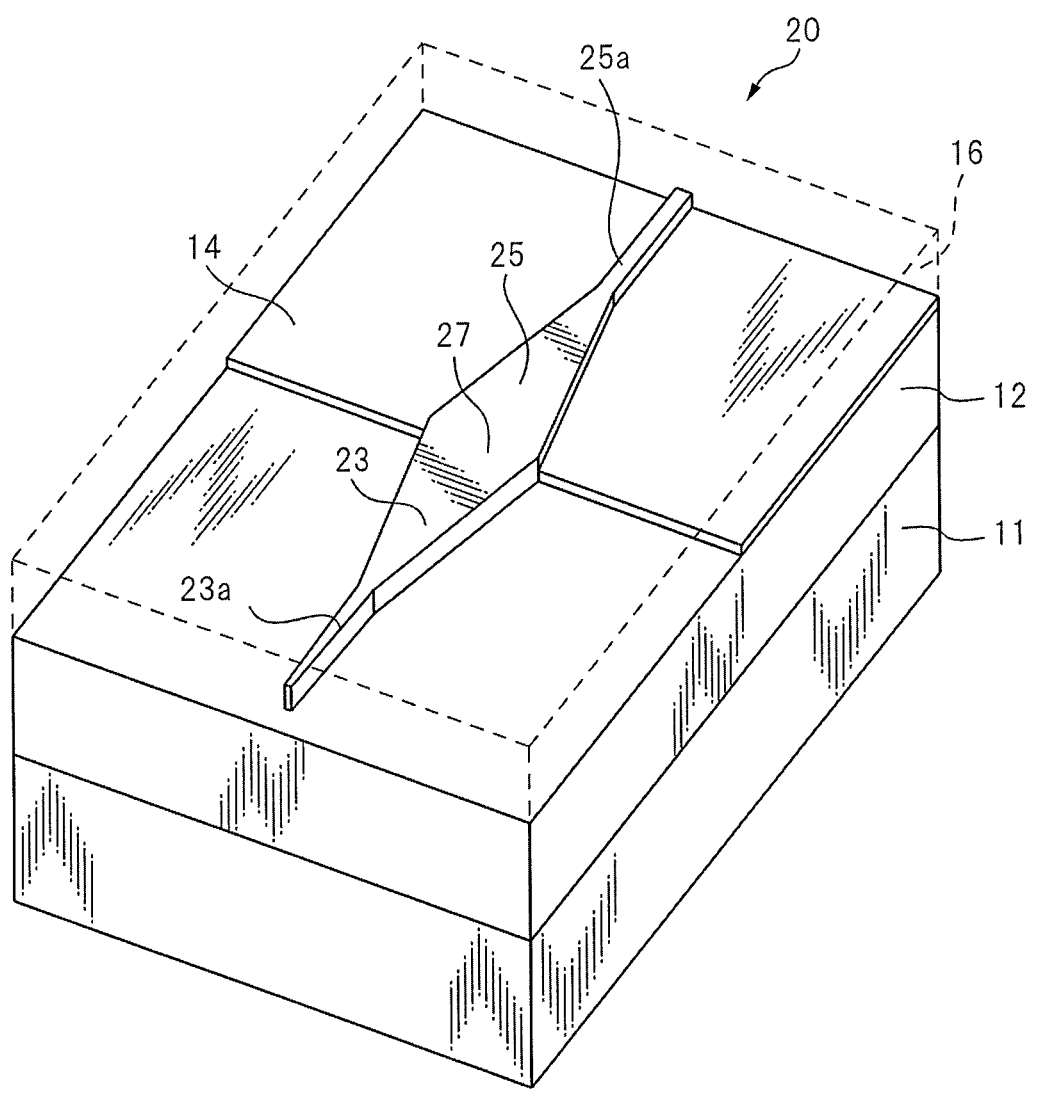
FIG. 9 is a perspective view depicting a second embodiment of an optical device disclosed in the specification.
Figure 10:
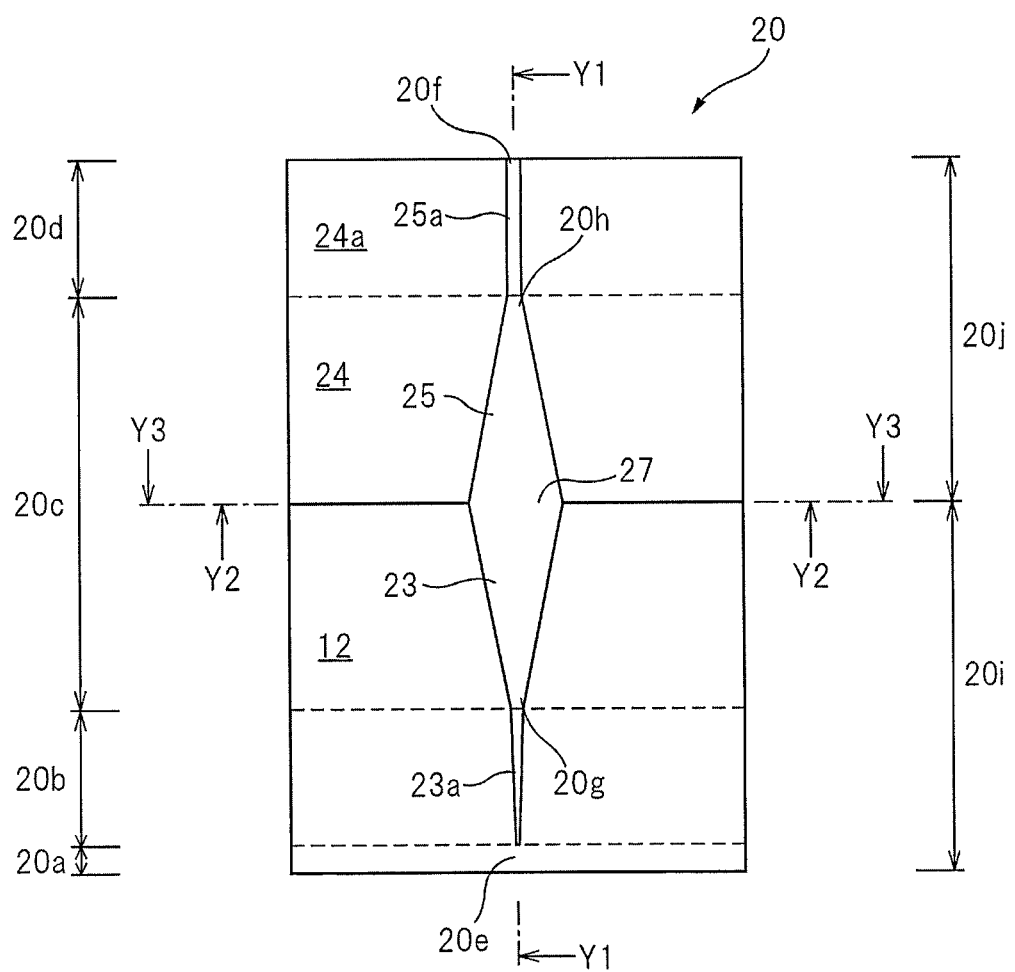
FIG. 10 is a plan view of the optical device depicted in FIG. 9.
Figure 11:
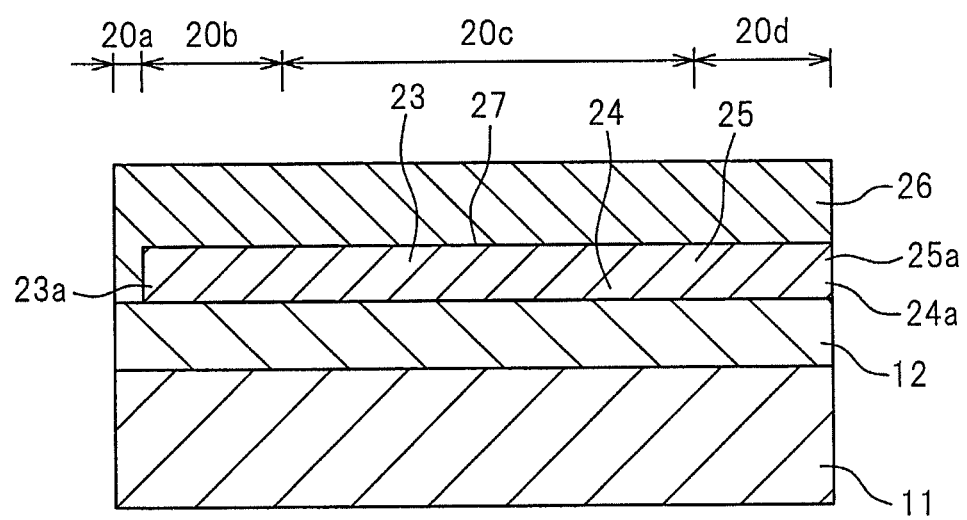
FIG. 11 is a cross section taken along line Y1-Y1 of FIG. 10.
Figure 12A:
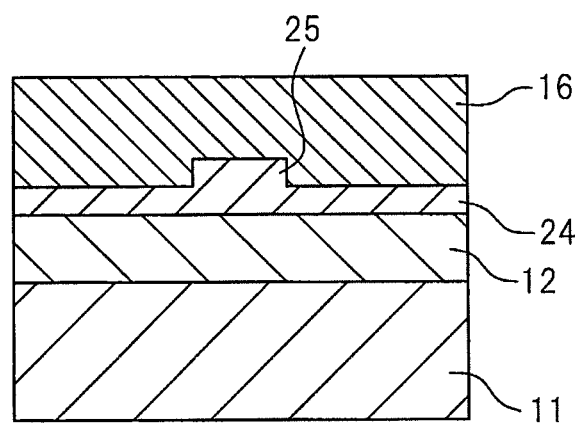
FIG. 12A is an end view taken along line Y2-Y2 of FIG. 10.
Figure 12B:
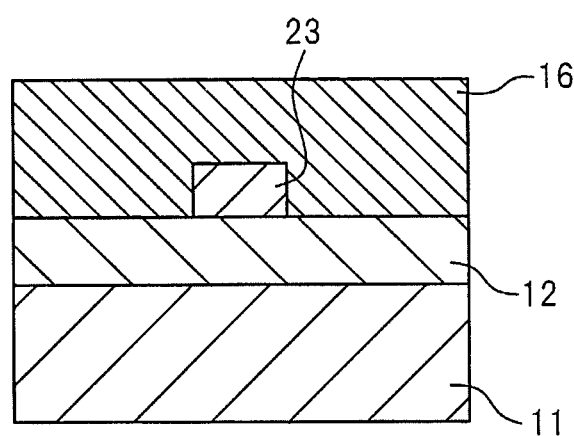
FIG. 12B is an end view taken along line Y3-Y3 of FIG. 10.

FIG. 9 is a perspective view depicting the second embodiment of the optical device disclosed in the specification. FIG. 10 is a plan view of the optical device depicted in FIG. 9. FIG. 11 is a cross section taken along line Y1-Y1 of FIG. 10. FIG. 12A is an end view taken along line Y2-Y2 of FIG. 10, and FIG. 12B is an end view taken along line Y3-Y3 of FIG. 10.

An optical device 20 of the embodiment has, in order from one end 20e to the other end 20f, a second extension unit 20a, a first extension unit 20b, a device body 20c, and a third extension unit 20d.

The optical device 20 also has a section 20i of a channel-type optical waveguide and a section 20j of a rib-type optical waveguide.

The device body 20c has a first end 20g which receives/outputs light from/to the first extension unit 20b, and a second end 20h which receives/outputs light from/to the third extension unit 20d.

In the optical device 20, the thickness of the core layer 23 is different from that in the foregoing first embodiment.

In the optical device 20, in an optical coupling unit 27 in which the core layer 23 and both of the slab layer 24 and the rib layer 25 are optically coupled, the thickness of the core layer 23 is equal to the sum of the thickness of the slab layer 24 and the thickness of the rib layer 25.

As depicted in FIG. 11, in the optical device 20, the core layer 23, the slab layer 24, and the rib layer 25 are integrally formed. In an end face taken along line Y1-Y1, the core layer 23 has a thickness equal to the thickness of a stack of the rib layer 25 and the slab layer 24 and extends from the first end 20g to the optical coupling unit 27. The core extension unit 23a has the same thickness as that of the core layer 23.

The rib layer 25 is a layered part which is projected from the slab layer 24 into the upper cladding layer 16 as depicted in FIG. 9 in a manner similar to the first embodiment.

The end view taken along line Y2-Y2 of FIG. 12A is an end view of a face crossing the optical coupling unit 27 viewed from the core layer 23 side to the rib layer 25 side. The end view taken along line Y3-Y3 depicted in FIG. 12B is an end view of a face crossing the optical coupling unit 27 viewed from the rib layer 25 side to the core layer 23 side.

In the optical coupling unit 27, the core layer 23 is physically coupled to the rib layer 25 and the slab layer 24 positioned below the rib layer 25.

In the optical coupling unit 27 of the optical device 20, the core layer 23, the slab layer 24, and the rib layer 25 are physically and optically coupled.

Figure 13:
FIG. 13 is a diagram depicting a profile of a mode field of light which propagates in the optical device of the second embodiment depicted in FIG. 11.
Figure 13:
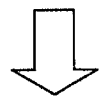
Figure 13:
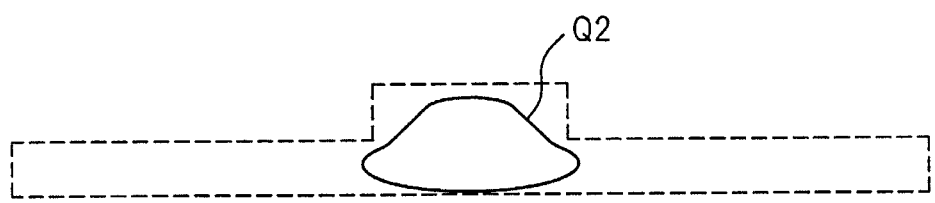

Referring now to FIG. 13, propagation of light between the section 20i of the channel-type optical waveguide and the section 20j of the rib-type optical waveguide in the optical coupling unit 27 will be illustrated.

A mode profile Q1 of FIG. 13 expresses the shape of the field of light on the side of the core layer 23 coupled to the optical coupling unit 27. The chain line surrounding the mode profile Q1 indicates the contour of the core layer 23. A mode profile Q2 of FIG. 13 expresses the shape of the field of light on the side of the slab layer 24 and the rib layer 25 coupled to the optical coupling unit 27. The chain line surrounding the mode profile Q2 indicates the contour of the slab layer 24 and the rib layer 25.

The mode profile Q1 on the core layer 23 side connected to the optical coupling unit 27 has a shape closer to the mode profile Q2 of light propagating in the slab layer 24 and the rib layer 25 than that in the foregoing first embodiment. Therefore, in the device body 20c, the optical coupling loss between the section 20i of the channel-type optical waveguide and the section 20j of the rib-type optical waveguide is further reduced.

The structure of each of the first, second, and third extension units 20b, 20a, and 20d of the embodiment is similar to that of the foregoing first embodiment.

In the optical device 20 of the embodiment, the discontinuous state in the optical coupling unit 27 is decreased more than that in the first embodiment, so that the optical coupling loss can be further reduced.

By the optical device 20 of the embodiment, effects similar to those of the first embodiment can be obtained.

Hereinafter, an optical transmitter disclosed in the specification will be illustrated.

Figure 14:
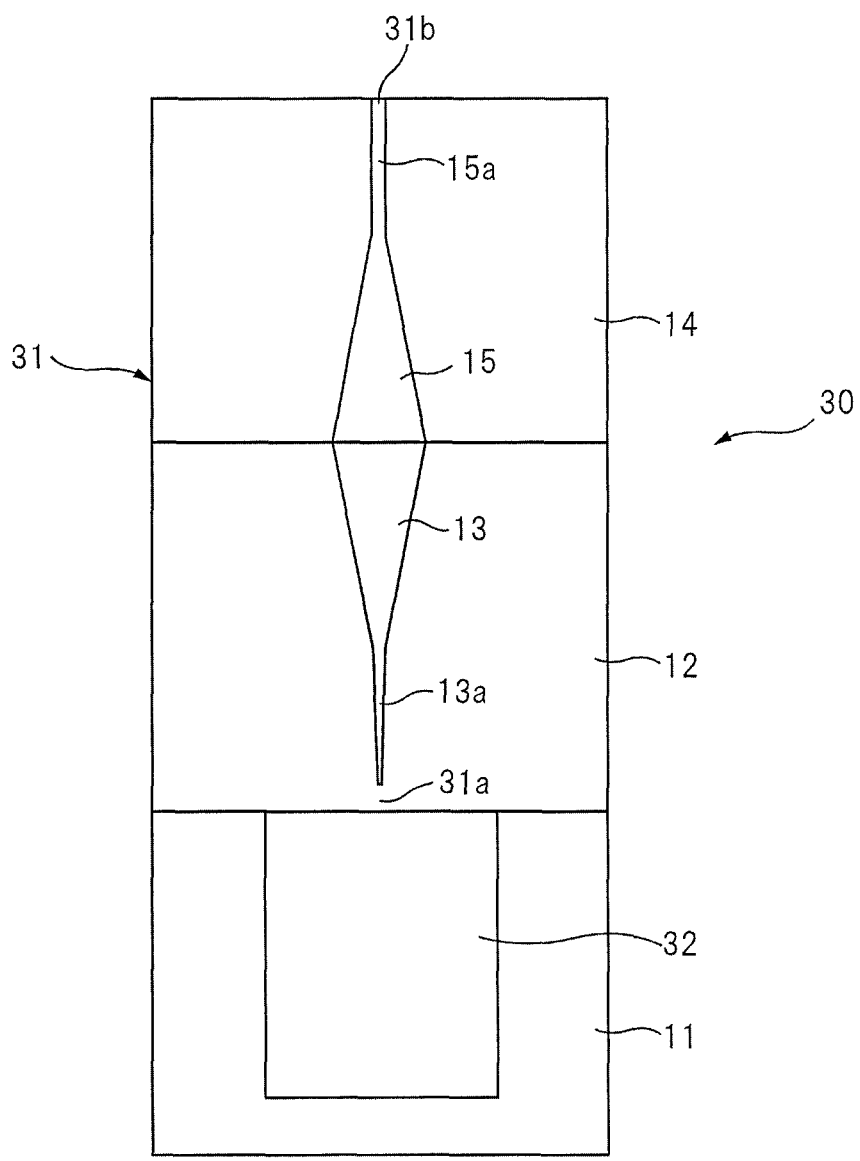
FIG. 14 is a diagram depicting a first embodiment of an optical transmitter disclosed in the specification.

FIG. 14 is a diagram depicting a first embodiment of an optical transmitter disclosed in the specification.

An optical transmitter 30 of the embodiment includes an optical device 31 converting the spot size of incident light and outputting the resultant light and a light generator 32 outputting light to one end 31a of the optical device 31.

The optical device 31 has the lower cladding layer 12 disposed on the substrate 11, the core layer 13 disposed on the lower cladding layer 12, the slab layer 14, and the rib layer 15. The structure of the optical device 31 is similar to that of the first embodiment of the optical device described above. The light generator 32 is disposed on the same substrate 11 of the optical device 31.

As the light generator 32, for example, a semiconductor laser can be used.

In the optical transmitter 30, light output from the light generator 32 is incident on the one end 31a of the optical device 31, and the light which is incident on the one end 31a is converted to light having a smaller spot size while propagating in the optical device 31, and the resultant light is output from the other end 31b to the outside.

The optical transmitter of the embodiment can convert the spot size of light generated by the light generator 32 to smaller size and output the resultant light while suppressing a coupling loss of the light.

Figure 15:
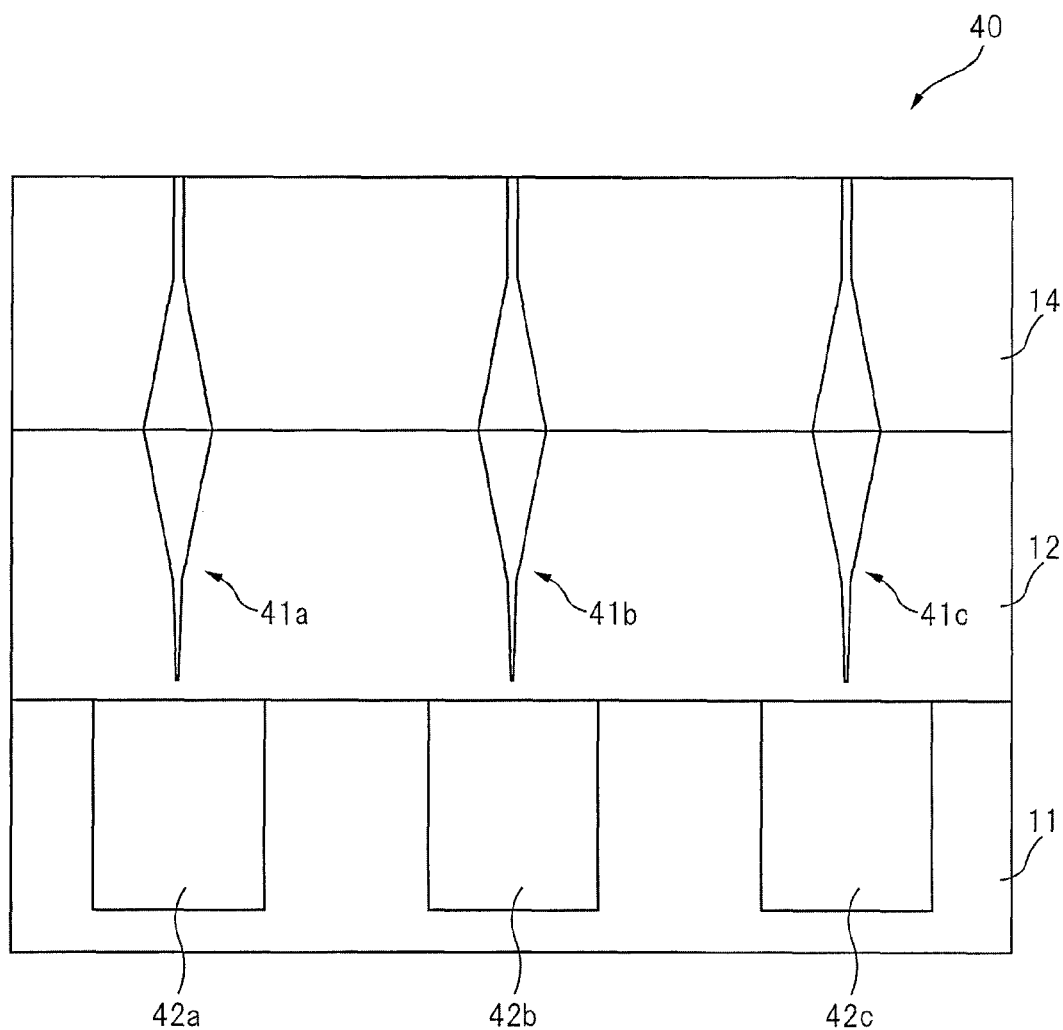
FIG. 15 is a diagram depicting a second embodiment of an optical transmitter disclosed in the specification.

FIG. 15 is a diagram depicting a second embodiment of an optical transmitter disclosed in the specification.

An optical transmitter 40 of the embodiment has a plurality of optical devices 41a, 41b, and 41c disposed side by side so that their light propagation directions are matched. Each of the optical devices 41a, 41b, and 41c converts the spot size of incident light and outputs the resultant light. Each of the optical devices 41a, 41b, and 41c has a structure similar to that of the first embodiment of the optical device. The plurality of optical devices 41a, 41b, and 41c are formed side by side on the same substrate 11.

The optical transmitter 40 has light generators 42a, 42b, and 42c corresponding to the optical devices 41a, 41b, and 41c, respectively. Light output from each of the light generators is supplied to the corresponding device among the optical devices 41a, 41b, and 41c. The plurality of light generators 42a, 42b, and 42c are also disposed on the substrate 11.

The above-described optical transmitter can output light signals whose light spot size is reduced in parallel.

An optical transceiver disclosed in the specification will now be illustrated.

Figure 16:
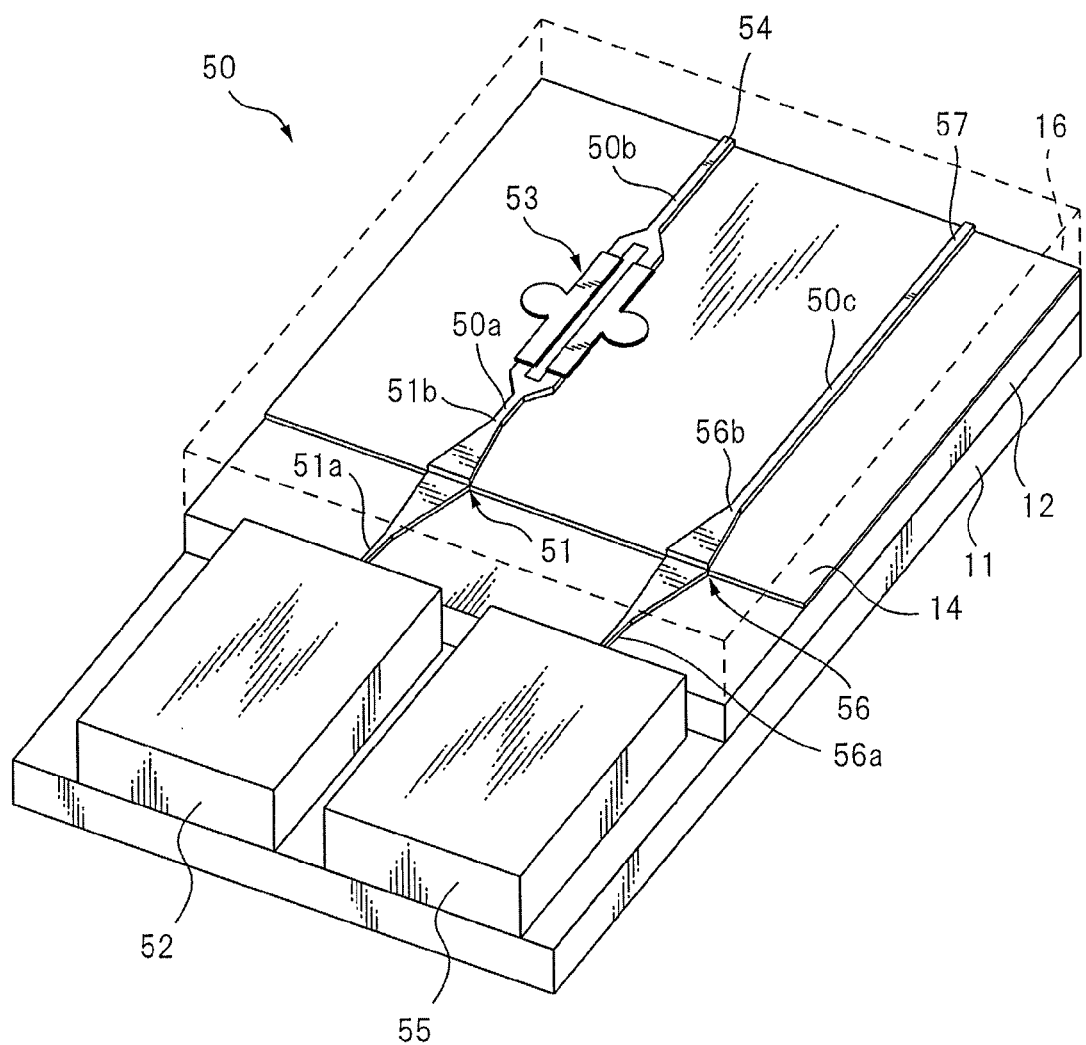
FIG. 16 is a diagram depicting an embodiment of an optical transceiver disclosed in the specification.

FIG. 16 is a diagram depicting an embodiment of an optical transceiver disclosed in the specification.

An optical transceiver 50 of the embodiment includes a first optical device 51 converting the spot size of incident light and outputting the resultant light and a light generator 52 outputting light to one end 51a of the first optical device 51. The structure of the first optical device 51 is similar to that of the first embodiment of the optical device. The light generator 52 is disposed on the same substrate 11 as that of the first optical device 51.

The light whose spot size is converted to smaller size by the first optical device 51 is supplied from the other end 51b to a silicon wire waveguide 50a disposed on the lower cladding layer 12. The light incident on the silicon wire conductor 50a propagates through the silicon wire waveguide 50a and enters a light modulator 53. As the light modulator 53, for example, a Mach-Zehnder modulator can be used.

The light modulator 53 modulates the incident light and outputs the modulated light to a silicon wire waveguide 50b disposed on the lower cladding layer 12. The silicon wire waveguide 50b propagates the incident light to an output unit 54.

The output unit 54 outputs the incident light to the outside.

The optical transceiver 50 includes an input unit 57 which receives light from the outside.

Light received by the input unit 57 propagates in a silicon wire waveguide 50c disposed on the lower cladding layer 12. The light which propagates through the silicon wire waveguide 50c is incident on the other end 56b of a second optical device 56 which will be described later.

The optical transceiver 50 also includes the second optical device 56 converting the spot size of incident light and outputting the converted light, and a photodetector 55 detecting light which is received from the other end 56b, propagates in the second optical device 56, and is output from one end 56a of the second optical device 56. The second optical device 56 shares the upper cladding layer 16 with the first optical device 51.

The spot size of light propagated in the silicon wire waveguide 50c is converted to larger one by the second optical device 56, and the resultant light is supplied to the photodetector 55.

In the optical transceiver 50, the light modulator 53, the silicon wire waveguides 50a, 50b, and 50c, the part from the optical coupling unit of the first optical device 51 to the other end 51b, and the part from the optical coupling unit of the second optical device 56 to the other end 56b are formed on the same slab layer 14. That is, such devices are formed by using the rib-type optical waveguide.

In the optical transceiver 50, the part from the one end 51a of the first optical device 51 to the optical coupling unit and the part from the one end 56a of the second optical device 56 to the optical coupling unit are disposed on the lower cladding layer 12. That is, such devices are formed by using the channel-type optical waveguide.

In the optical transceiver of the embodiment, while suppressing coupling loss of light, the spot size of light generated by the light generator 52 can be converted to smaller size, and resultant light can be output. Furthermore, while suppressing coupling loss of light, the spot size of the incident light is converted to larger size, and resultant light can be detected.

A preferred first embodiment of a method of manufacturing the optical device will be illustrated below with reference to the drawings.

In the embodiment, a method of manufacturing the optical device of the first embodiment will be illustrated.

Figure 17:
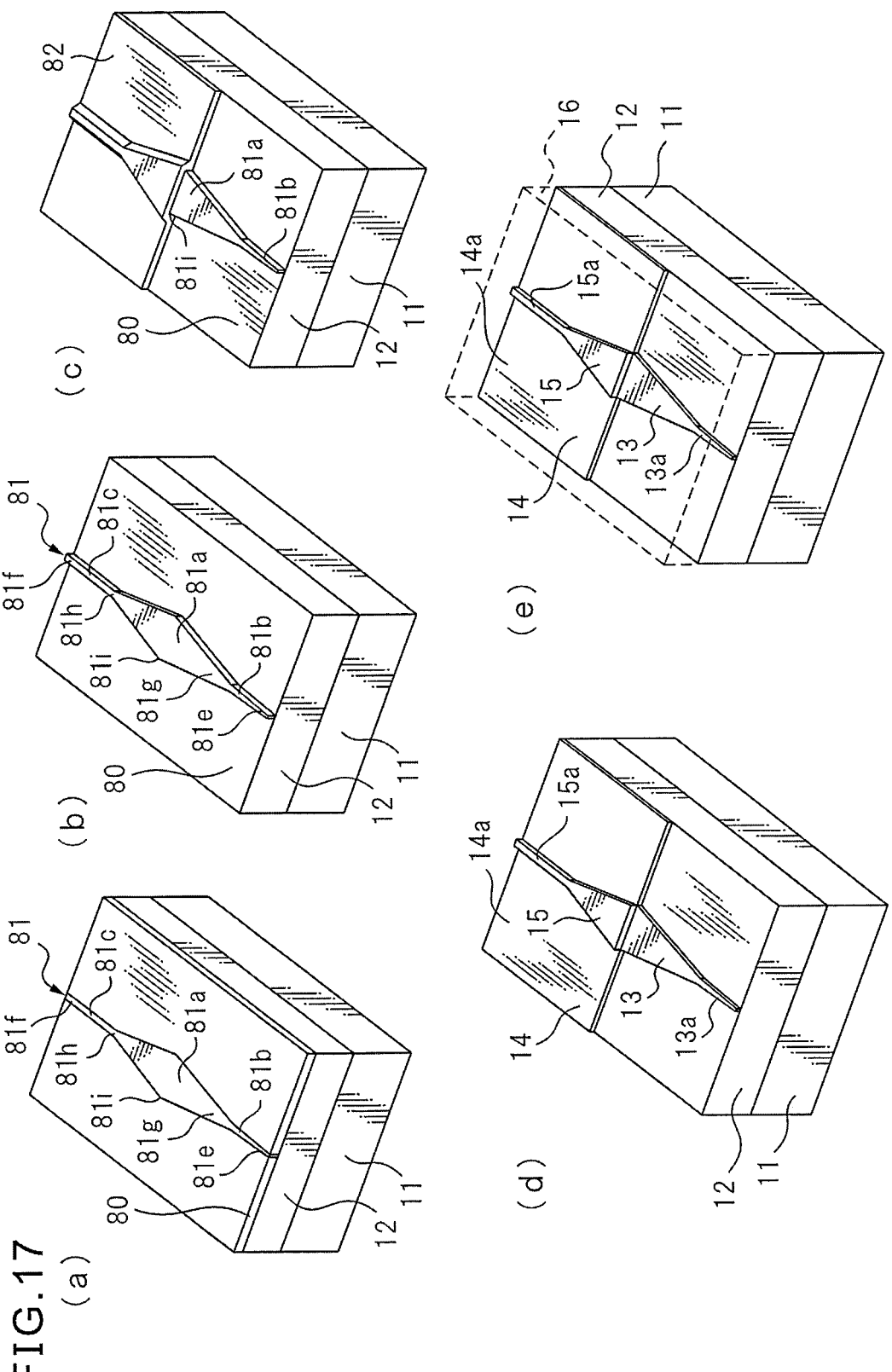
FIG. 17 is a diagram depicting a first embodiment of a method of manufacturing an optical device disclosed in the specification.

First, as depicted in FIG. 17(a), a mask 81 is formed on an optical waveguide layer 80 of the substrate 11 of semiconductor on which the lower cladding layer 12 and the optical waveguide layer 80 are stacked in order by using the silicon microfabrication technique. In the embodiment, as the semiconductor substrate 11 on which the lower cladding layer 12 and the optical waveguide layer 80 are stacked in order, an SOI (Silicon On Insulator) is used. Therefore, the substrate 11 is a silicon substrate, the lower cladding layer 12 is a silicon oxide (SiO$_2$) layer, and the optical waveguide layer 80 having predetermined thickness is a single-crystal silicon layer. The material of the optical waveguide layer 80 may be polycrystal or amorphous material. As the material of the lower cladding layer 12, a material other than silicon oxide (SiO$_2$) such as polymer may be used. The mask 81 has a shape corresponding to an integration of the core extension unit, the core layer, the rib layer, and the rib extension unit in the first embodiment of the optical device. In the embodiment, the second extension unit of the first embodiment of the optical device is not formed. In the embodiment, the thickness of the lower cladding layer 12 is 3,000 nm, and the thickness of the optical waveguide layer 80 is 200 nm.

The mask 81 is formed so as to extend from one end 81e to the other end 81f. The mask 81 has a part 81a corresponding to the device body of the optical device of the first embodiment, a part 81b corresponding to the core extension unit, and a part 81c corresponding to a rib extension unit. The part 81a extends from a first end 81g toward a second end 81h. The part 81a is formed on the optical waveguide layer 80 to extend along the direction from the first end 81g toward the second end 81h so that its width increases from the first end 81g to the maximum width and, after that, decreases to the second end 81h. In the embodiment, the direction from the first end 81g toward the second end 81h matches with the direction from the one end 81e to the other end 81f.

As depicted in FIG. 17(b), using the silicon microfabrication technique, the optical waveguide layer 80 is etched to some depth with the mask 81. In the embodiment, the optical waveguide layer 80 is etched to the depth of 100 nm from the surface. At this time, the thickness of the portion of the optical waveguide layer 80 covered with the mask 81 remains 200 nm.

Next, as depicted in FIG. 17(c), a mask 82 covering the mask 81 and the optical waveguide 80 in the region from a part 81i having the maximum width of the mask 81 to the other end 81f is formed along the direction from the one end 81e toward the other end 81f.

The exposed part in the mask 81 is removed. Specifically, the mask 81 in the region from the one end 81e to the part 81i having the maximum width of the mask 81 is removed along the direction from the one end 81e toward the other end 81f. The removal of the mask 81 in the region may be performed before formation of the mask 82.

As depicted in FIG. 17(d), the optical waveguide layer 80 is etched until the lower cladding layer 12 is exposed with the mask 82. In the embodiment, the portion of the optical waveguide layer 80 which is not covered with the mask 82 and has a thickness of 100 nm is etched. As a result, in the embodiment, the portion of the optical waveguide layer 80 covered with the mask 81 in the region from the one end 81e to the part 81i having the maximum width of the mask 81 along the direction from the one end 81e toward the other end 81f has a thickness of 100 nm. The part of the optical waveguide layer 80 covered with the mask 81 in the region from the part 81i having the maximum width of the mask 81 to the other end 81f along the direction from the one end 81e toward the other end 81f has a thickness of 200 nm. The part of the optical waveguide layer 80 covered only with the mask 82 has a thickness of 100 nm.

After that, the masks 82 and 81 are removed. In such a manner, the core layer 13, the slab layer 14, the rib layer 15, the core extension unit 13a, and the rib extension unit 15a are formed on the lower cladding layer 12. The core layer 13, the slab layer 14, and the rib layer 15, which are from the optical waveguide layer 80, are integrally formed so that the part having the maximum sectional area (width) of the core layer 13 and the part having the maximum sectional area (width) of the rib layer 15 are optically coupled to each other.

As depicted in FIG. 17(e), the upper cladding layer 16 is formed on the lower cladding layer 12 so as to cover the core layer 13, the slab layer 14, the rib layer 15, the core extension unit 13a, and the rib extension unit 15a. In the embodiment, as the material of the upper cladding layer 16, silicon oxide (SiO$_2$) is used. As the material of the upper cladding layer 16, a material other than silicon oxide (SiO$_2$) such as polymer may be used.

According to the manufacturing method of the foregoing embodiment, using the silicon microfabrication technique, the optical device having the channel-type optical waveguide and the rib-type optical waveguide can be easily manufactured.

A preferred second embodiment of a method of manufacturing the optical device will be illustrated below with reference to the drawings.

In the embodiment, a method of manufacturing the optical device of the second embodiment will be illustrated.

First, as depicted in FIG. 18(a), a mask 84 is formed on an optical waveguide layer 83 of the substrate 11 of semiconductor on which the lower cladding layer 12 and the optical waveguide layer 83 are stacked in order by using the silicon microfabrication technique. In the embodiment, as the semiconductor substrate 11 on which the lower cladding layer 12 and the optical waveguide layer 83 are stacked in order, an SOI (Silicon On Insulator) is used. Therefore, the substrate 11 is a silicon substrate, the lower cladding layer 12 is a silicon oxide (SiO$_2$) layer, and the optical waveguide layer 83 having predetermined thickness is a single-crystal silicon layer. The material of the optical waveguide layer 83 may be polycrystal or amorphous material. As the material of the lower cladding layer 12, a material other than silicon oxide (SiO$_2$) such as polymer may be used. The mask 84 has a shape corresponding to an integration of the core extension unit, the core layer, the rib layer, and the rib extension unit in the second embodiment of the optical device. In the embodiment, the second extension unit of the second embodiment of the optical device is not formed. In the embodiment, the thickness of the lower cladding layer 12 is 3,000 nm, and the thickness of the optical waveguide layer 83 is 200 nm.

The mask 84 is formed so as to extend from one end 84e to the other end 84f. The mask 84 has a part 84a corresponding to the device body of the optical device of the second embodiment, a part 84b corresponding to the core extension unit, and a part 84c corresponding to a rib extension unit. The part 84a extends from a first end 84g toward a second end 84h. The part 84a is formed on the optical waveguide layer 83 to extend along the direction from the first end 84g toward the second end 84h so that its width increases from the first end 84g to the maximum width and, after that, decreases to the second end 84h. In the embodiment, the direction from the first end 84g toward the second end 84h matches with the direction from the one end 84e to the other end 84f.

As depicted in FIG. 18(b), using the silicon microfabrication technique, the optical waveguide layer 83 is etched to some depth with the mask 84. In the embodiment, the optical waveguide layer 83 is etched to the depth of 100 nm from the surface. At this time, the thickness of the portion of the optical waveguide layer 83 covered with the mask 84 remains 200 nm.

Next, as depicted in FIG. 18(c), a mask 85 covering the mask 84 and the optical waveguide 83 in the region from a part 84i having the maximum width of the mask 84 to the other end 84f is formed along the direction from the one end

84e toward the other end 84f. In the embodiment, the part of the mask 84 exposed at this stage is not etched.

Figure 18:
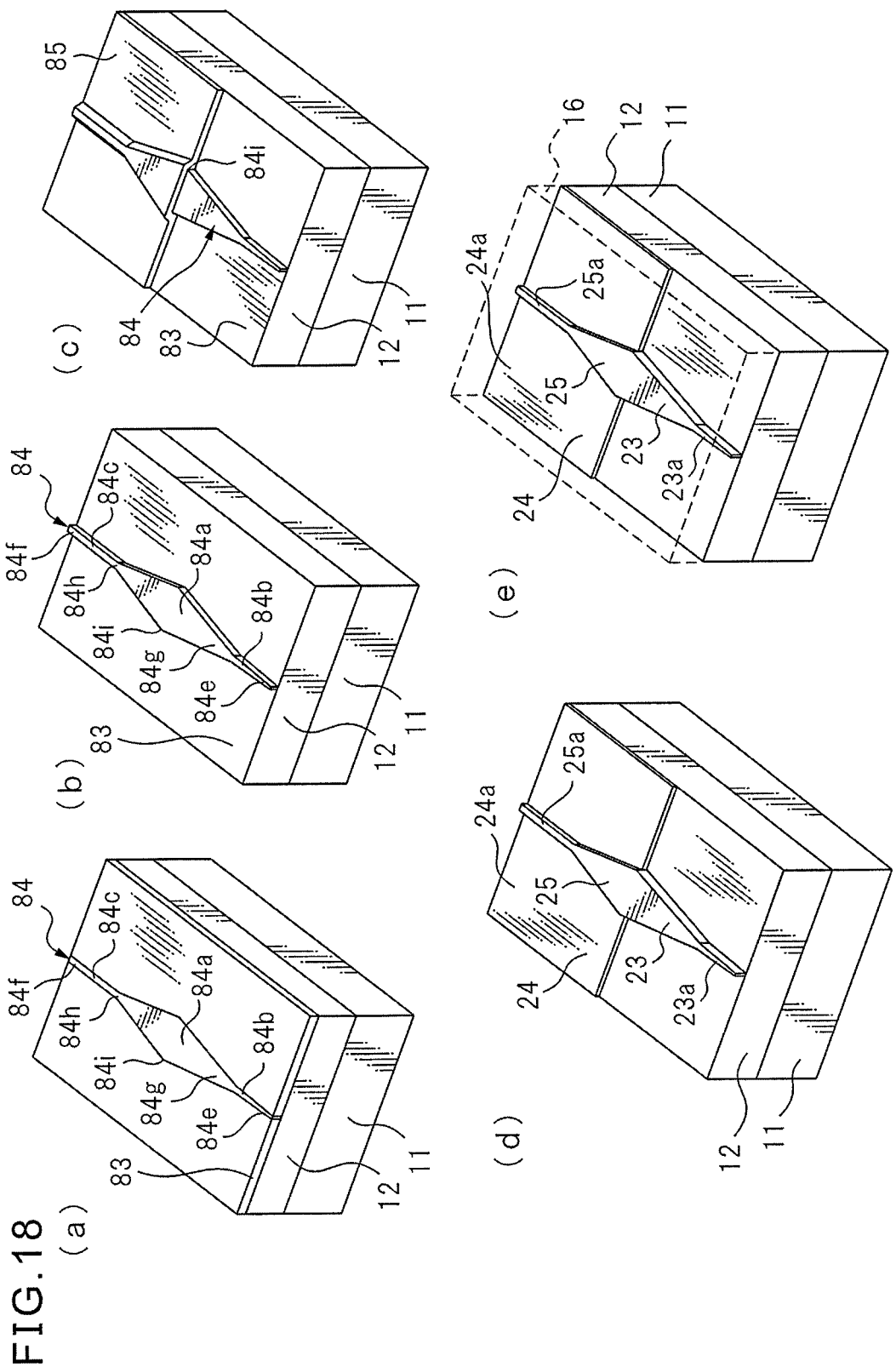
FIG. 18 is a diagram depicting a second embodiment of the method of manufacturing the optical device disclosed in the specification.

As depicted in FIG. 18(*d*), the optical waveguide layer 83 is etched until the lower cladding layer 12 is exposed with the masks 84 and 85. In the embodiment, the portion of the optical waveguide layer 83 which is not covered with the masks 84 and 85 and has a thickness of 100 nm is etched. As a result, the part of the optical waveguide layer 83 covered with the mask 84 has a thickness of 200 nm, and the part of the optical waveguide layer 83 covered only with the mask 85 has a thickness of 100 nm. In the etching of the optical waveguide layer 83, the surface of the lower cladding layer 12 may be etched. Consequently, the allowable range of the depth of etching is wider than that of the first embodiment of the above-described manufacturing method.

After that, the masks 85 and 84 are removed. In such a manner, the core layer 23, the slab layer 24, the rib layer 25, the core extension unit 23a, and the rib extension unit 25a are formed on the lower cladding layer 12. The core layer 23, the slab layer 24, and the rib layer 25 are integrally formed from the optical waveguide layer 83 so that the part having the maximum sectional area (width) of the core layer 23 and the part having the maximum sectional area (width) of the rib layer 25 are optically coupled to each other.

As depicted in FIG. 18(*e*), the upper cladding layer 16 is formed on the lower cladding layer 12 so as to cover the core layer 23, the slab layer 24, the rib layer 25, the core extension unit 23a, and the rib extension unit 25a. In the embodiment, as the material of the upper cladding layer 16, silicon oxide ($SiO_2$) is used. As the material of the upper cladding layer 16, a material other than silicon oxide ($SiO_2$) such as polymer may be used.

According to the manufacturing method of the foregoing embodiment, the etching management precision in the process of FIG. 18(*d*) is reduced. Therefore, the yield of the optical device manufactures improves. By the manufacturing method of the embodiment, using the silicon microfabrication technique, the optical device having the channel-type optical waveguide and the rib-type optical waveguide can be easily manufactured.

In the present invention, the optical device, the optical transmitter, the optical receiver, the optical transceiver, and the method of manufacturing an optical device in the foregoing embodiments can be properly changed without departing from the gist of the present invention. The components of any one of the embodiments can be properly also applied to another embodiment.

Figure 19:
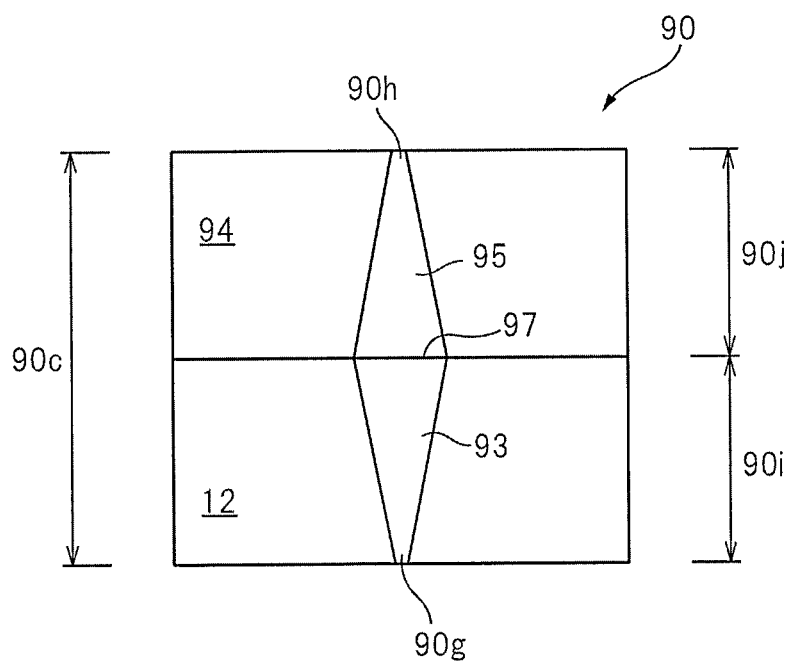
FIG. 19 is a diagram depicting another embodiment of the optical device disclosed in the specification.

For example, the optical device described in each of the embodiments may have the part of a device body 90c as depicted in FIG. 19. An optical device 90 depicted in FIG. 19 has the lower cladding layer 12 and a core layer 93 disposed on the cladding layer 12 and extending from a first end 90g which receives/outputs light, with increase in its sectional area (width), along a direction from the first end 90g toward a second end 90h. The optical device 90 also has a slab layer 94 disposed on the lower cladding layer 12 and extending from the first end 90g to the second end 90h along a direction from the first end 90g toward the second end 90h. The optical device 90 also has a rib layer 95 disposed on the slab layer 94 and extending to the second end 90h, with decrease in its the sectional area (width), along a direction from the first end 90g toward the second end 90, and an upper cladding layer (not depicted) disposed on the core layer 93, the slab layer 94, and the rib layer 95. The core layer 93 and both of the slab layer 94 and the rib layer 95 are optically coupled with the part in which the sectional area (width) of the core layer 93 and the part in which the sectional area of the rib layer 95 is the maximum. In the optical device 90, a section 90i of a channel-type optical waveguide and a section 90j of a rib-type optical waveguide are optically coupled to each other in an optical coupling unit 97. To the first end 90g, for example, another optical device having a channel-type optical waveguide is optically coupled. To the second end 90h, for example, another optical device having a rib-type optical waveguide is optically coupled.

In the above-described optical transceiver, the optical receiver having the second optical device is formed integrally with the optical transmitter. The optical receiver having the second optical device may be an independent optical device.

Further, in the above-described optical transceiver, the optical transmitter and the optical receiver are disposed on the same substrate and the upper and lower cladding layers are integrally formed. The optical transmitter and the optical receiver may be disposed on different substrates, and the upper and lower cladding layers may be formed separately.

Figure 20:
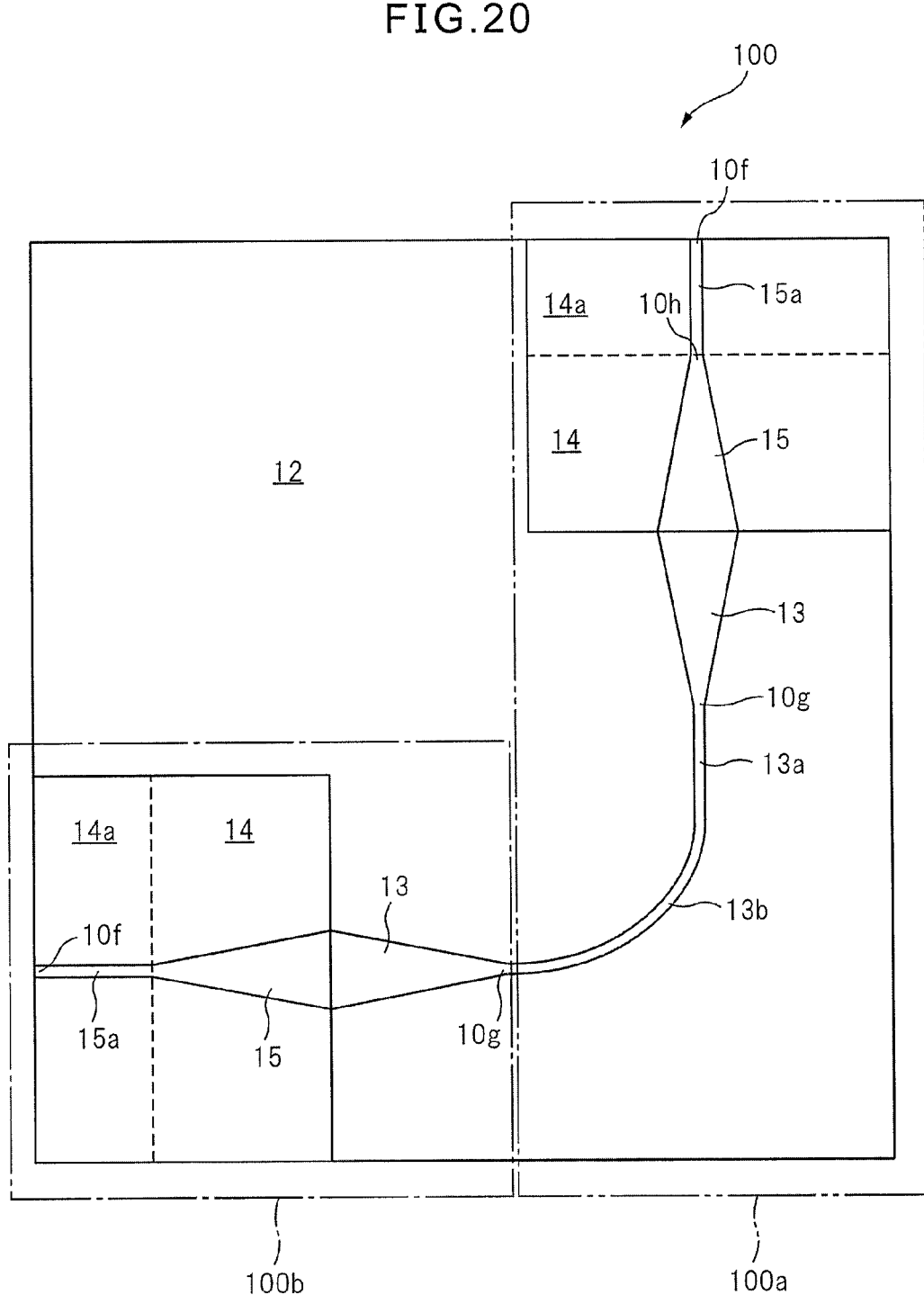
FIG. 20 is a diagram depicting an embodiment of an optical integrated device disclosed in the specification.

A plurality of optical devices disclosed in the specification may be disposed on the same substrate as depicted in FIG. 20. FIG. 20 is a diagram depicting an embodiment of an optical integrated device disclosed in the specification.

An optical integrated device 100 depicted in FIG. 20 has a first optical device 100a and a second optical device 100b. The first optical device 100a has a configuration similar to that of the optical device depicted in FIG. 8. The second optical device 100b has a structure obtained by eliminating the first and second extension units from the optical device depicted in FIG. 1.

In the optical integrated device 100, the first and second optical devices 100a and 100b have a common lower cladding layer 12 disposed on a not-depicted substrate.

The first optical device 100a includes a bent core extension unit 13b, a core extension unit 13a, a core layer 13, a slab layer 14, a rib layer 15 disposed on the slab layer 14, a slab extension unit 14a, and a rib extension unit 15a disposed on the slab extension unit 14a. The components of the first optical device 100a are disposed on the lower cladding layer 12.

The second optical device 100b includes the core layer 13, the slab layer 14, the rib layer 15 disposed on the slab layer 14, the slab extension unit 14a, and the rib extension unit 15a disposed on the slab extension unit 14a. The components of the second optical device 100b are disposed on the lower cladding layer 12.

In the optical integrated device 100, the first and second optical devices 100a and 100b have a not-depicted common upper cladding layer.

In the optical integrated device 100, for example, light incident from the other end 10f of the second optical device 100b propagates through the section of the rib-type optical waveguide in the second optical device 100b, after that, propagates through the section of the channel-type optical waveguide in the second optical device 100b, and enters the bent core extension unit 13b of the first optical device 100a.

The light which enters the bent core extension unit 13b of the first optical device 100a propagates through the section of the channel-type optical waveguide in the first optical device 100a, propagates through the section of the rib-type optical waveguide in the first optical device 100a and, after that, is output from the other end 10f of the first optical device 100a.

All examples and conditional language recited herein are intended for pedagogical purposes to aid in understanding the invention and the concepts contributed to furthering the art, and are to be construed as being without limitation to such specifically recited examples and conditions, nor does the organization of such examples in the specification relate to the superiority or inferiority of the invention. Although the embodiments of the present invention have been described in detail, it should be understood that various changes, substitutions, and alterations can be made hereto without departing from the spirit and scope of the invention.

What is claimed is:

1. An optical device comprising:
   a first cladding layer;
   a core layer directly disposed on the first cladding layer and, with increase in its sectional area, extending from a first end which receives/outputs light along a direction from the first end toward a second end;
   a slab layer directly disposed on the first cladding layer and extending to the second end along the direction from the first end toward the second end;
   a rib layer disposed on the slab layer and, with decrease in its sectional area, extending to the second end along the direction from the first end toward the second end; and
   a second cladding layer disposed on the core layer and the rib layer,
   wherein the core layer and the slab layer are directly coupled in a part in which the sectional area of the core layer is the maximum and a part in which the sectional area of the rib layer is the maximum and the core layer and both of the slab layer and the rib layer are optically coupled in a part in which the sectional area of the core layer is the maximum and a part in which the sectional area of the rib layer is the maximum.

2. The optical device according to claim 1, wherein in the part in which the core layer and the slab layer are directly coupled, width of the core layer and that of the rib layer are equal to each other.

3. The optical device according to claim 2, wherein the thickness of the core layer is equal to the thickness of the slab layer in the part where the core layer and the slab layer are directly coupled.

4. The optical device according to claim 2, wherein the thickness of the core layer is equal to sum of the thickness of the slab layer and the thickness of the rib layer in the part where the core layer and the slab layer are directly coupled.

5. The optical device according to claim 1, wherein thickness of the core layer and the rib layer is constant.

6. The optical device according to claim 1, further comprising:
   a first optical waveguide joined to the first end; and
   a second optical waveguide joined to the second end and whose width is the same as that of the first optical waveguide.

7. The optical device according to claim 1, wherein the first cladding layer and the second cladding layer extend from the first end to form an extension unit in which the first cladding layer and the second cladding layer are stacked.

8. The optical device according to claim 7, wherein in the extension unit, the core layer extends from the first end with decrease in its sectional area.

9. An optical transmitter comprising:
   a substrate;
   an optical device including
   a first cladding layer disposed on the substrate,
   a core layer directly disposed on the first cladding layer and, with increase in its sectional area, extending from a first end which receives/outputs light along a direction from the first end toward a second end,
   a slab layer directly disposed on the first cladding layer and extending to the second end along the direction from the first end toward the second end,
   a rib layer disposed on the slab layer and, with decrease in its sectional area, extending to the second end along the direction from the first end toward the second end, and
   a second cladding layer disposed on the core layer and the rib layer,
   the core layer and the slab layer being directly coupled in a part in which the sectional area of the core layer is the maximum and a part in which the sectional area of the rib layer is the maximum and the core layer and both of the slab layer and the rib layer being optically coupled in a part in which the sectional area of the core layer is the maximum and a part in which the sectional area of the rib layer is the maximum; and
   a light generator disposed on the substrate, outputting light to the first end, making the light propagate through the optical device and output from the second end.

10. A method of manufacturing an optical device, comprising:
    forming, directly on a first cladding layer, a core layer extending from a first end along a direction from the first end toward a second end with increase in its sectional area, and a slab layer extending to the second end along the direction from the first end toward the second end and including, on the slab layer, a rib layer which extends to the second end along the direction from the first end toward the second end with decrease in its sectional area, the core layer and the slab layer being directly coupled in a part in which the sectional area of the core layer is the maximum and a part in which the sectional area of the rib layer is the maximum and the core layer and both of the slab layer and the rib layer being optically coupled in a part in which the sectional area of the core layer is the maximum and a part in which the sectional area of the rib layer is the maximum; and
    forming a second cladding layer on the core layer and the slab layer.

11. The method of manufacturing an optical device according to claim 10, wherein forming the core layer and the slab layer comprises:
    forming, on an optical waveguide layer formed on the first cladding layer, a first mask extending along a direction from the first end toward the second end so that width of the first mask increases from the first end, becomes maximum and, after that, decreases to the second end;
    etching the optical waveguide layer to some depth with the first mask;
    forming a second mask covering the first mask and the optical waveguide layer in a region from the part in which the width of the first mask is maximum to the second end along the direction from the first end toward the second end;
    removing the first mask in a region from the first end to the part in which the width of the first mask is maximum along the direction from the first end toward the second end; and
    etching the optical waveguide layer using the second mask until the first cladding layer is exposed.

12. The method of manufacturing an optical device according to claim 10, wherein forming the core layer and the slab layer comprises:
    forming, on an optical waveguide layer formed on the first cladding layer, a third mask extending along a direction from the first end toward the second end so that width of the third mask increases from the first end, becomes maximum and, after that, decreases to the second end;
    etching the optical waveguide layer to some depth with the third mask;

forming a fourth mask covering the third mask and the optical waveguide layer in a region from the part in which the width of the third mask is maximum to the second end along the direction from the first end toward the second end; and etching the optical waveguide layer using the third and fourth masks until the first cladding layer is exposed.

* * * * *